(12) United States Patent
Chong et al.

(10) Patent No.: US 7,152,229 B2
(45) Date of Patent: Dec. 19, 2006

(54) WORKFLOW CODE GENERATOR

(75) Inventors: Kelvin Chong, Sunnyvale, CA (US); Srinivas Mandyam, San Jose, CA (US); Krishna Vedati, Sunnyvale, CA (US)

(73) Assignee: Symbol Technologies, Inc, Holtsville, NY (US)

( * ) Notice: Subject to any disclaimer, the term of this patent is extended or adjusted under 35 U.S.C. 154(b) by 671 days.

(21) Appl. No.: 10/346,965

(22) Filed: Jan. 17, 2003

(65) Prior Publication Data

US 2003/0208743 A1 Nov. 6, 2003

Related U.S. Application Data

(60) Provisional application No. 60/350,858, filed on Jan. 18, 2002.

(51) Int. Cl.
*G06F 9/45* (2006.01)
*G06F 9/44* (2006.01)

(52) U.S. Cl. ............... 717/146; 717/131; 717/141; 717/155

(58) Field of Classification Search ........ 717/124–152, 717/155
See application file for complete search history.

(56) References Cited

U.S. PATENT DOCUMENTS

| | | | | |
|---|---|---|---|---|
| 5,613,117 A | * | 3/1997 | Davidson et al. | 717/144 |
| 5,812,850 A | * | 9/1998 | Wimble | 717/131 |
| 6,442,663 B1 | * | 8/2002 | Sun et al. | 711/202 |
| 6,560,774 B1 | * | 5/2003 | Gordon et al. | 717/146 |

* cited by examiner

*Primary Examiner*—Tuan Dam
*Assistant Examiner*—Chuck Kendall
(74) *Attorney, Agent, or Firm*—Ingrassia Fisher & Lorenz, P.C.

(57) ABSTRACT

A workflow code generator for generating executable code for multi-channel and/or multi-modal applications. The code generator may include a parser for reading application input files and creating internal representations of declarative statements within the input files. The code generator may further include a model analyzer, which processes the internal model to detect errors, perform optimization, and prepare for outputting the result. The code generator uses a symbol or mapping table for storing references to resources that have been used by the input application. The code generator assigns code fragments to object patterns, resolves data object references by referring to mapping table, and traverses the objects and emits code assigned to the objects.

20 Claims, 11 Drawing Sheets

WORKFLOW CODE GENERATOR

CROSS-REFERENCE TO RELATED APPLICATIONS,

This application claims priority to U.S. Provisional Patent Application No. 60/350,858, filed on Jan. 18, 2002, which is fully and completely incorporated herein by reference.

FIELD OF THE INVENTION

This invention generally relates to a workflow code generator and more particularly, to a workflow code generator for generating code for multi-channel and/or multi-modal applications.

BACKGROUND

Computing models have changed dramatically over the last two decades. The paradigm shifts from mainframes to personal computing to ubiquitous computing drive the need for significantly different programming models. Today we are in the personal computing era, where the desktop is the primary computing device. As we move to the next era, access to information from different terminals in a variety of different channels and modes becomes important.

In the following discussion, the terms terminal, channel, mode, multi-channel application, and multi-modal application are defined as follows:

A terminal refers to the device that is operated by a user. In addition to the traditional Internet terminal such as a networked desktop, there has been a tremendous increase in the types of terminal devices including PDAs, Smartphones, handheld pads, 2-way pagers and voice recognition terminals.

A channel refers to the medium, or the "pipe" over which the interaction takes place. The main channels of access are wireline access over the Internet, wireless access over cellular and other over-the-air networks and voice access over an analog (e.g., PSTN) network.

A mode refers to the way a user interacts with the application. Users can request information synchronously through a real-time, server-side application over the networks, or interact with an offline application on a client device such as a PDA. In addition, the application can asynchronously notify the user with an alert to initiate the interaction. These three modes are referred to as online, offline and alert modes of operation, respectively.

A multi-channel application is an application that can be accessed via two or more channels, including but not limited to wireline access by web browser, wireless access by internet-enabled phone, wireless access by PDA (Personal Digital Assistant), and voice access by telephone. The content and functionality may be the same or differ slightly across channels.

A multi-modal application is an application that can be accessed via two or more modes, including but not limited to real-time, disconnected, and asynchronous access.

Thus, it is desirable for today's systems and applications to support end-user interaction in these multiple modes of operation over multiple channels. One solution is to build separate applications, e.g., deploy a separate alerts application, a separate data applications or a separate set of offline applications (one per each category/make). Another solution is to build unified applications that support multi-channel, multi-modal interaction. One such solution is described in patent application Ser. No. 10/054,623 of Chong et al., entitled "System and Method for Building Multi-modal and Multi-channel Applications" (the '623 application), which is assigned to the present assignee and which is fully and completely incorporated herein by reference.

The system described in the '623 application provides a highly integrated visual design environment based on a modeling paradigm that is referred to as User Interaction Modeling. This structured approach separates back-end data integration, business-logic and presentation during design, and delivers highly scalable modular applications that are flexible to extend, and easy to maintain.

FIG. 1 illustrates one example of a multi-channel, multi-modal application, which allows a traveling salesperson to access corporate information while on the move. The application may operate as follows in multiple modes and channels:

1. The salesperson makes a voice call into the company's enterprise voice portal. The salesperson quickly accesses a personalized menu, and asks for the status on a specific customer account.

| | |
|---|---|
| a. Mode: | Real-time |
| b. Channel: | Voice |

2. A large amount of information is provided regarding a customer order. Instead of listening to all the information, the salesperson asks that the information be sent to his WAP phone.

| | |
|---|---|
| a. Mode: | Real-time |
| b. Channel: | Voice |

3. The salesperson hangs up, and immediately receives a WAP alert on his phone. The salesperson continues to interact from the WAP channel of his phone. He quickly scans the information—there are a number of updates, of which the customer needs to be informed.

| | |
|---|---|
| a. Mode: | Alert, then real-time browsing |
| b. Channel: | Wireless Data - WAP |

4. The sales person forwards relevant information to the customer as an email summary, and also as an SMS message.

| | |
|---|---|
| a. Mode: | Alert |
| b. Channel: | Wireless Data - SMS |

5. The sales person then stores the updated customer information to the local device store.

| | |
|---|---|
| a. Mode: | Off-line |
| b. Channel: | Device local |

As described above, one of the facets of a multi-channel application is the ability to interact with the user offline, which is provided by application logic, data and presentation, which resides inside the terminal device instead of the server. This enables users to interact with applications when there is no network connection to the server, where the online application is residing. Moreover, the data collected by the device local (offline) application can be synchronized with the server when a network connection is established.

The '623 application explains details of how a multi-channel application is created on a server. patent application Ser. No. 10/053,767 of Chong et al., entitled "Efficient System and Method for Running and Analyzing Multi-channel, Multi-modal Applications" (the '767 application), which is assigned to the present assignee and which is fully and completely incorporated herein by reference, explains the details of how a multi-channel application may be run.

In view of the foregoing, it would be desirable to develop an application that will be functionally equivalent on a homogenous set of devices, each with their own development environments and hardware and software differences.

One solution would be to create different sets of applications, each developed to address the various constraints of the devices. Some possible advantages to this approach may include the following:

Application developers can uniquely customize an application to fully utilize the resources on the particular hardware platform.

The application developer might be more able to fully optimize the application for size and speed by learning all of the features of the hardware platform.

This approach is also fine if the goal is to create an application that only works well on one platform.

However, there are some obvious disadvantages, such as:

Developers would need to learn about the details of a development environment before they can begin development. This information must then be shared amongst all developers creating the application. Alternatively, there can be one team that does the application development and several other teams that port the code to other platforms. In the first scenario where all application developers know about all the platforms, there is a learning curve involved for all developers to be up to speed and working on the same page. In addition, as new device types appear with different development environments, the engineers would again have to learn together. In the second scenario, there is an obvious lag in the product release schedules since code ports take time.

Code maintenance becomes an issue when there are different ways of doing the same thing. If each hardware platform has its own development environment, using a different programming language with different APIs, then there are essentially separate code bases for each different environment. When bugs arise or features need to be added, these code changes need to be propagated through all the code bases. It becomes an engineering issue to keep track of all changes.

As new devices appear, if development requires a different development environment, then a new code base needs to be created for the application to work on the platform.

Another approach may be to develop a middleware platform for the various architectures in their native implementation that can run applications designed to work on this middleware platform. The JAVA programming language is one such platform. As long as the device supports such a platform, an application written to run on the JAVA programming language platform will run on the device. However, the JAVA programming language not exist on all hardware platforms. In some cases, the JAVA programming language cannot be run on a platform because of resource constraints. In these cases, it is possible to create something that might behave like the JAVA programming language. However, this is reinventing something that already exists. Although the ideal would be to develop all applications in the JAVA programming language and have them run on different devices, the reality is far from this ideal. As previously mentioned, there are different device profiles (API) that still must be accounted for during code development.

As described in the '623 application, workflow models can be used to design applications in a higher-level paradigm. The workflow paradigm provides a high-level framework to begin generating code. The end-user need only know about the details of the workflow. A code generator may be employed to handle differences in the way applications work on different devices.

Code generation moves the need for many developers to know about different hardware platforms to one central location, the code generator. In such a scenario, a code generator may contain die intelligence about the requirements of the development environments. The code generator can be made to generate C code or JAVA programming language code or code in any other language. Note that the code generator can also output hardware specific code (code that uses a particular CPU instruction set). However, this need not be the code generator's goal since the development environments have already been optimized to deal with such issues. The code generator creates higher-level code that can be accepted by the development environments.

The present invention provides a workflow code generator, which may be used to generate JAVA programming language based offline (device resident) applications from a unified model, which may be created by a system for creating multi-channel and/or multi-modal applications, such as the system described in the '623 patent application.

SUMMARY OF THE INVENTION

One advantage of the present invention is that it provides a code generator that allows developers to maintain only one code base for an application. In addition, as new devices with different operating platforms appear, developers should not need to modify the application. Instead, the code generator only needs to be updated once. Then, all developed applications will be able to work on the new device.

There are several issues to be concerned with while generating code for a multitude of devices. The following are some examples of problems that the workflow code generator of the present invention will solve:

1. Platform CPU Architectures—the hardware architectures for different devices can be very different from one another. For example, the instruction sets for code are different for different CPUs. In order to generate code for different architectures, the code generator is adapted to be aware of the hardware for which it will generate code. As such, the workflow code generator hides the details of CPU instruction sets and other hardware details from the user.

To solve the problem of hardware differences, the workflow code generator can output code in a variety of formats. Note that although the code generator can also output the native byte-code that the CPU can directly understand, the preferred embodiment of the present invention generates to a higher-level language such as C or the JAVA programming language and then allows the device manufacturer's compiler to handle optimization issues specific to its hardware.

For example, the code generator can generate JAVA programming language code that can then be compiled and run on a device that has a JAVA programming language virtual machine (JVM) installed.

One advantage of the JVM is that it abstracts the details of CPU and hardware from the software. As long as a device implements a JVM, this is valid. Alternatively, the code generator can also generate byte-code that can be directly run on the JVM without going through a compile stage.

For devices that do not support or implement a JVM, the code generator can emit C or C++ code that can then be compiled using a compiler that generates CPU-specific instructions for a particular hardware platform. Also, the code generator can emit the CPU-specific instructions directly to assembly language or to machine language.

Some devices might not have an ANSI compliant C compiler for which the code generator could generate code. In such cases, the code generator architecture can emit code in other languages that are supported on that hardware platform.

Note that the code generator also has the option to use one method of code generation over another to access hardware-specific features not available in some languages. For example, a JAVA programming language compiler might not have access to certain hardware features that a C compiler might have.

In order to successfully generate code, the code generator should be aware of the hardware on which the application will be run. While the user designs an application once using the workflow paradigm, it will be the responsibility of the code generator to output code that can be run on different hardware platforms.

2. Operating System Architecture and Services (API)—the way that the operating system invokes an application and the services it provides may vary. Even within the same operating system environment, there can be differences due to the device (hardware) such as screen sizes and input mechanisms. For example, some devices have no keypad to enter text. These devices might require input through a pen-based system. Others might recognize voice as input. The workflow code generator automatically conforms to such variances.

Hardware platforms expose their resources to software through APIs. These APIs are different for different platforms. For example, perhaps the input mechanism is a pen rather than a keyboard. The API calls could be vastly different in such a case. One API might only contain calls to receive pointer position and pen up/down events. The keyboard API might not contain any pointer information. It might just return the key that was pressed. In addition, the operating system might handle resources differently from other operating systems (e.g., instead of a pre-emptive task scheduler, there might be a cooperative task scheduler where applications must explicitly release CPU resources).

Even the way that applications are started could be different for different operating systems. The following is an example of how code is started in WinCE versus J2ME.

For console-type application that can be run on a command-line (e.g. in UNIX), the entry point to an application is a method called "main" for an application written in "C". In such an application, the main thread that starts the application will execute all code and terminate after "main" finishes (program exits). However, for native WINDOWS operating system applications, the entry point is "WinMain( )" for a "C" program. Then, another thread for the user interface will handle other events in the application (such as button pushes). The natural programming model in this case is an event-driven model. The code generator will have to adjust its emitted code to run successfully in these different environments.

For the JAVA programming language, there is the J2ME specification that defines how applications are launched. However, within J2ME, there are several profiles, each describing different ways of executing code (see section on device profiles). These profiles are similar to the problem above of how applications get launched and what happens after they are launched. In a J2SE application, the entry point is "main" and the main thread will continue until finished executing "main". However, in a MIDP application, the entry point is "stampp" and it is expected that functionality will return immediately back to the application launcher or else the device will "hang". Again, the application will function in an event driven model rather than a single-threaded model top-to-bottom model.

3. Different Programming Languages—some development environments might not support development in a particular language. For example, some devices (e.g. QUALCOMM BREW) only support development in C. Others might only support development in a flavor of the JAVA programming language (e.g. RIM GPRS BLACKBERRY). Still others might only support new languages (e.g. MICROSOFT Stinger and C#). In order to create applications on all these platforms, the code generator is adapted to be aware of all these languages and language variants.

The code generator abstracts above the programming language. The code generator may be coded to be aware of how to generate code depending on the device on which the application is going to run.

For example, on QUALCOMM BREW devices, the application development environment is in C. It does not support the JAVA programming language yet. So, if the application were intended to run on such devices, the code generator would generate C code that would then be picked up by the device's development environment to be compiled into runnable code.

4. Device Profiles—there are difficulties in writing code for software that abstracts the hardware such as the JVM. In the case of the JAVA programming language and J2ME (JAVA 2 Micro Edition—a subset of the JAVA programming language plus API for specific devices), many different profiles exist to address issues such as CPU power and screen size. For each profile, an application designer would need to learn die intricacies of that profile. The added complexity is that although a profile can be run on different devices supporting the profile, the device might take on various sizes and shapes which needs to be accounted for during application development.

The workflow code generator is aware of all of these profiles and therefore simplifies the process for the application designer.

Even within the same operating environment, there can be differences due to the device (hardware) such as screen sizes and input mechanisms. The workflow code generator handles application logic. The view code generator handles issues dealing with human interaction aspects of the application such as presenting data and gathering input from the user.

Operating systems usually have API specific to that operating system to handle such functions. The view code generator must access these functions. However, the difficulty is that the API and the way of calling the API are different for different platforms, even though the language to access the API might be the same.

This is apparent in a J2ME environment. J2ME uses The JAVA programming language to develop applications with. However, within J2ME, there exist several profiles to address the strengths and weaknesses of the various hardware platforms that J2ME can exist on. For instance, in a MIDP (mobile information device profile) ease, the screen sizes are very small and the keys are typically the alphanumeric keys on a phone. On a PDA profile, the interaction could be through a pen interface so the API for this profile would be different.

Thus, it is not just a matter of the developers having to learn a new programming language for the device, but they must also learn about the APIs. This is taken care of by the view code generator, which generates code that uses API for a particular platform. As shown in FIG. 2, although the JAVA programming language can be used across many devices, there are still many different APIs in the form of profiles that only operate on certain devices. These APIs are not common between the various devices even though the JAVA programming language is common. The code generator is aware of the APIs available to it.

5. Code Maintenance—from an engineering perspective, having to develop custom applications for a multitude of platforms that are as different as described in points 1 through 4 above, requires developers to maintain different code bases for each profile. This results in maintenance problems as features are added and bugs are fixed. A change in one code base would need to be manually propagated to the other code bases. The workflow code generator automatically compensates for such changes, thereby substantially eliminating these maintenance problems.

High Level Code Generation Example

The following is a simple example of how the code generator may adjust its output for the application to function correctly on a WinCE platform and on a JAVA programming language J2SE platform. The example relates to an application that allows the user to "login" to an application. The application first presents the user with some information about what to enter and provides a field for the user to enter some information. The user enters the data and submits the data, which Then gets. processed by the workflow. If the user entered the correct information, the user is allowed to continue the application. Otherwise, the first screen appears again.

First, the application is separated into three different sections, the view or presentation, the workflow, and the data. (The '623 application describes these sections in detail.) The view handles details about presenting information to the user and collecting user-entered data. The workflow does some computation on the user input. In this case, it compares the user-entered information against the data.

FIG. 3 illustrates the flow of the view (1), workflow (2) and data (3) sections in a WinCE application. In a WinCE environment, the code generator may create a file that contains a "WinMain( )" function, using C code. The "WinMain( )" function is where the operating system will give some CPU time and start the application. In this "WinMain( )", the code generator may generate code to initialize a view from which to show some user prompts and to gather user-entered information. Then, the code generator emits code to wait in a loop and forwards application events to the window that was just initialized. It stays in the loop until the application sends an event to terminate the WinCE application.

FIG. 4 illustrates the flow of a J2SE application, i.e., steps (A1)–(A3) and (B1)–(B2). In contrast to a WinCE application, a J2SE application's entry point is called "main( )". Using JAVA programming language code, the code generator may output "main( )" that will initialize a view from which to show user prompts and to gather user-entered information. To start the application, the JVM must load up the application and make a call to the "main( )" method using the main application thread. Once the application displays a view, the main application thread dies because it will exit the "main( )" function call. This is different from the WinCE version in that it does not have to wait in a loop. Now, although the main thread dies, the application is still running because a new thread was created to handle events to the view that was displayed. To exit the application, the code generator emits code to call the System.exito API.

Referring back to the WinCE version, to handle the workflow, the call to a workflow must return after it is done rather than executing states one-by-one. Because this is an event-driven model, the workflow processes data and instructs the view what to display next.

This is in contrast to the J2SE version, where the "main( )" method will make a call to a controller. This controller does not return until the "exit" state is reached. Instead of instructing the view what to display next and then returning, it displays the view and waits for the user to enter data (the wait is optional).

Most of the differences between platforms will occur in the view sections. The reason is because vendors have different APIs and different ways of calling APIs. In addition, there is no common set of API between platforms. For example, a button in WinCE is actually a call to "createWindow( )" with the correct class name, whereas in J2SE, a button is a "Button" class that gets added to an Abstract Window Toolkit (AWT) container. Also, the method by which the workflow "waits" for, data to process will be different.

In WinCE, a button might be created for the user to press when the user is finished entering data. This button press is an operating system event that gets passed into the view handler. At that point, the view handler must then make a call to the workflow runner, passing it the data that the user entered. The workflow must then return back to the view, at which point the view renders the next "page" of information and returns back to the operating system.

In J2SE, the button press is also an event into the AWT system. However, the workflow was the one that initiated the view. So, what is done is that the workflow could call the "wait( )" API to wait for the view to be finished. When the user pressed the button to submit the information, the view does not call the workflow like the WinCE version. Instead, it posts the data in a data structure and then calls the "notify( )" API to return back to the workflow. The workflow then processes the data and repeats the cycle for the next view.

Note that it is possible for the WinCE version to use the method described for the J2SE version and vice-versa. However, the code generator will preferably output code that is most natural and most optimized for the existing platform.

Thus, different hardware and software platforms have different requirements as to how applications get launched and how they function after they are started. If an application developer were to manually write code, the developer would have to maintain multiple code bases for each device that is to be run on. Although some level of optimization can be achieved by manual customization, it would not provide enough of a benefit to maintain many different versions of the same application since changes to the application would involve manual changes to all the different code bases. However, using the workflow paradigm along with the present code generator, it is become possible to only maintain one code base. The code generator of the present invention outputs the code for the different platforms.

According to one aspect of the present invention, a method for transforming an input file for multi-channel application into executable code is provided. The method includes the steps of: analyzing declarative statements within the input file to form an intermediate model of the declarative statements; analyzing the declarative statements to remove inconsistencies; analyzing the intermediate model to provide optimizations; appending additional information to objects in the intermediate model to aid in code generation; and outputting code in an executable language.

According to another aspect of the present invention, a system is provided for generating executable code for a multi-channel application. The system includes parsing means for receiving input files for the application and generating an intermediate model of the declarative statements within the input files; pre-processing means for optimizing and removing inconsistencies from the intermediate model, thereby generating a pre-processed model; means for traversing the pre-processed model and assigning code fragments for patterns of objects; and code generating means for traversing the objects and generating executable code assigned to each object.

These and other aspects, features and advantages of the present invention, as well as the invention itself, will be best understood from the following drawings and detailed description.

DETAILED DESCRIPTION OF THE EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

Figure 1:
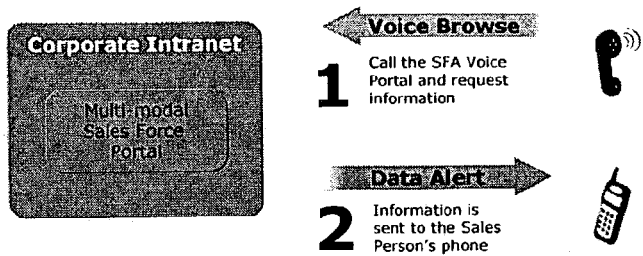
FIG. 1 illustrates one example of a multi-channel, multi-modal application.
Figure 2:
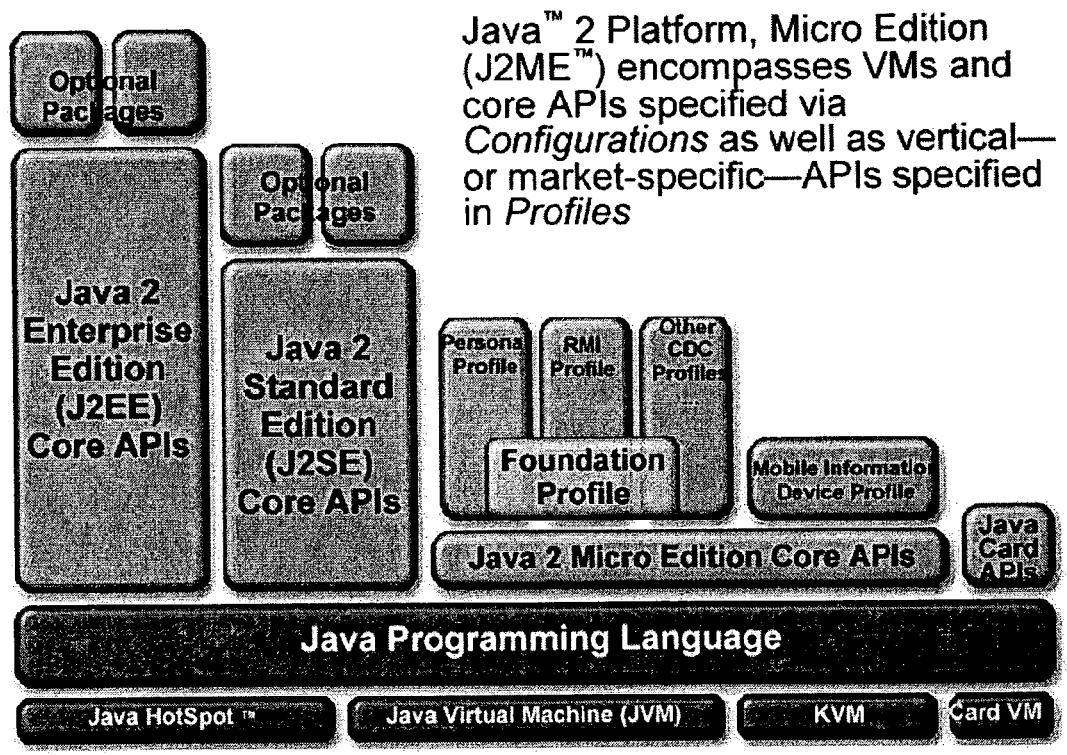
FIG. 2 is a block diagram of the JAVA programming language 2 platform profiles.
Figure 3:
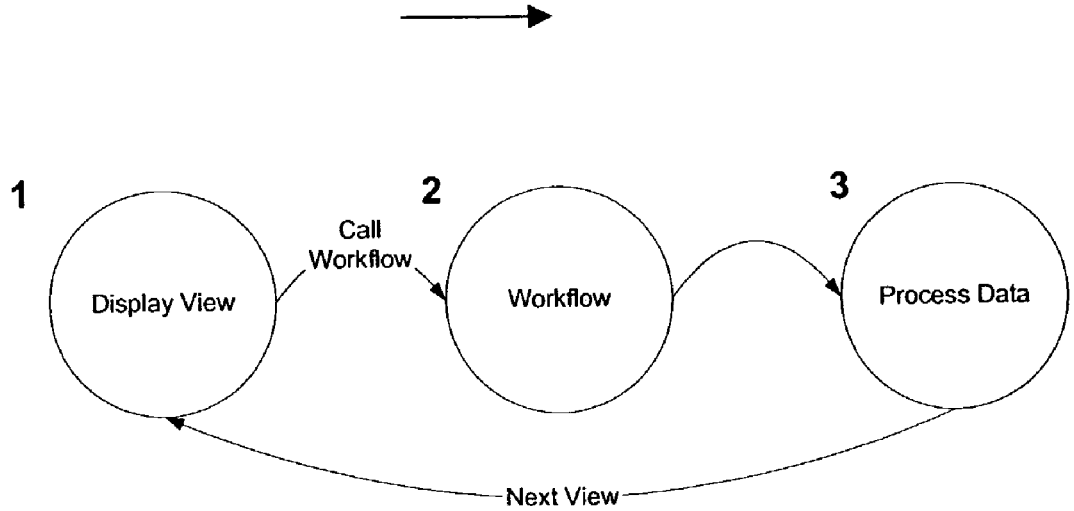
FIG. 3 is a diagram illustrating the operational flow of a sample WinCE application.
Figure 4:
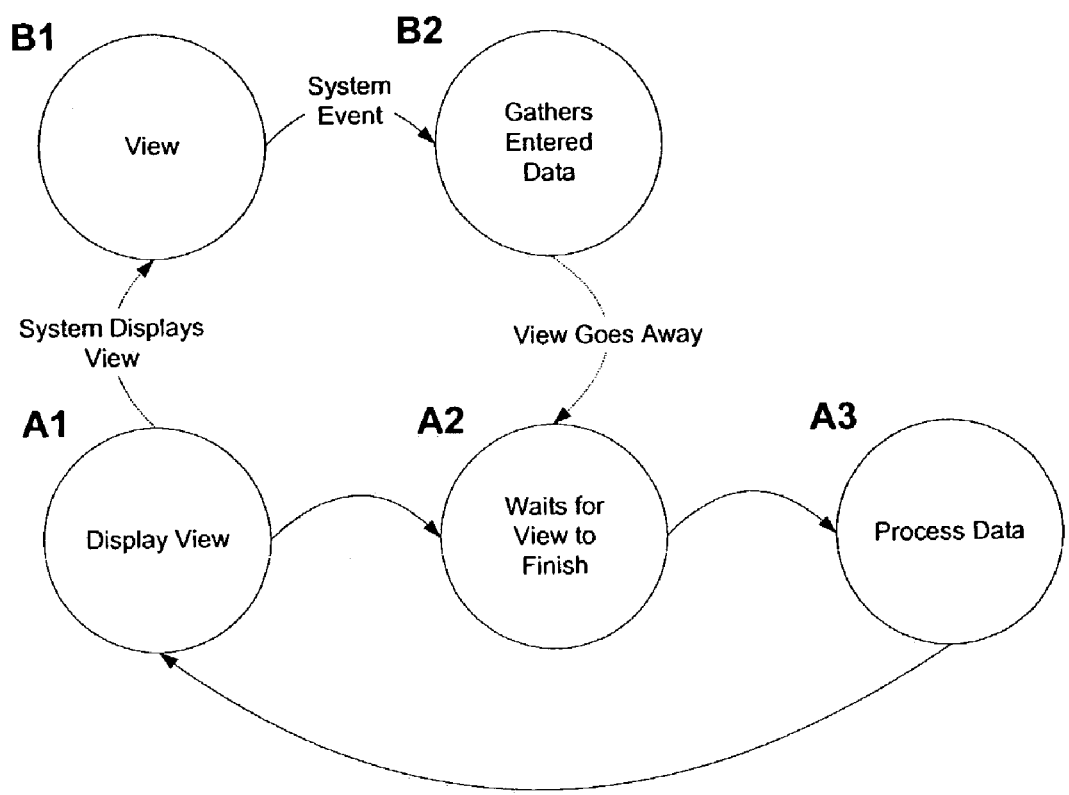
FIG. 4 is a diagram illustrating the operational flow of a sample J2SE application.
Figure 5:
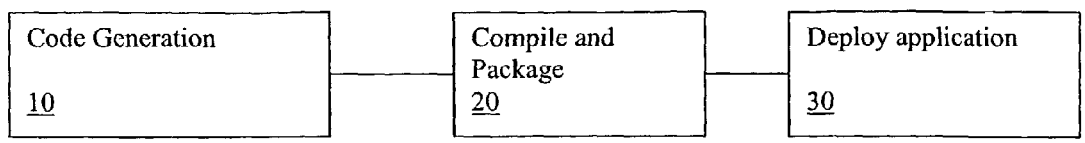
FIG. 5 is a block diagram illustrating the general method for building a multi-channel and/or multi-modal application.

FIG. 5 illustrates a general method for building a multi-channel and/or multi-modal application. The entire build process consists of three steps. The first step 10 is code generation. This involves running the project files through the tools described in the above sections to generate code. This step is performed by the workflow code generator of the preferred embodiment. The resulting code is then passed through the second step 20, where the code is compiled. The compiled code is packaged as appropriate, depending on the target. Finally, the packaged applications are deployed to the various targets in step 30.

Figure 6A:
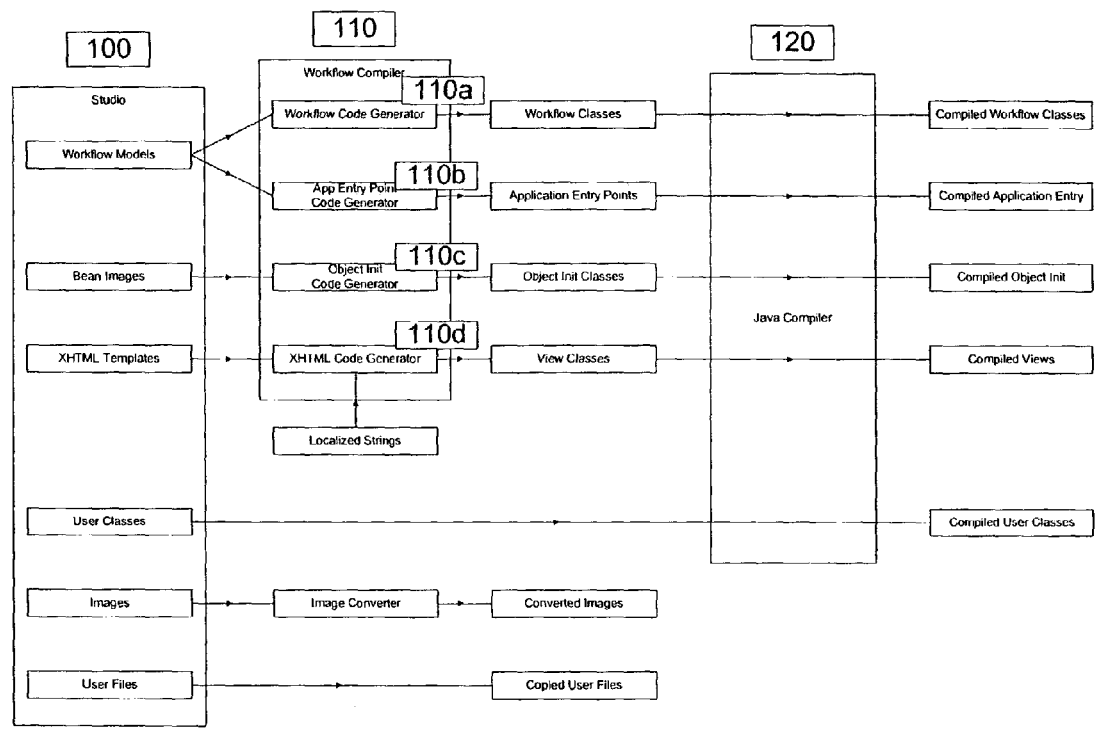
FIG. 6a is a block diagram illustrating how the code generator of the present invention may be implemented within a development environment.

FIG. 6a shows how the code generator may be implemented within a development environment, such as the development environment described in the '623 application. Users create applications with the help of a multi-modal and/or multi-channel application building system 100, which may be substantially identical to the system described in the '623 patent. The various files system 100 creates are descriptions of the application functionality. These files are then passed through the workflow compiler generators 110, which generate executable code from the inputs received from system 100. For example, there is a workflow code generator that outputs code for the workflows, and application entry code generator for generating application entry points, and an object initialization code generator for creating object initialization classes from bean images. An XHTML code generator outputs code to present information to the user (i.e., view classes) from XHTML templates and localized strings and to get user-entered data. Depending on what device the application is intended to run on, the outputted code will be of a type that the device's development platform can understand. FIG. 6a illustrates the code generator for generating JAVA programming language code (i.e., for converting human-readable input into executable JAVA programming language code). However, this can be replaced by a code generator for C.

The application building system 100 generates the input files for the code generators. Within the application building system block 100, the workflow models block represents the application logic; the bean images block represents data bound to an object; the XHTML Templates block represents the user interface described using XHTML language; the User Classes bock represents user-created program definitions; the Images block represents images referenced in the XHTML templates; and the User Files block represents additional resources used by the application. Within the workflow compiler block 110, there are four different code generators: workflow code generator 110a, AppEntry Point code generator 110b, Object Init code generator 110c, and XHTML code generator 110d. The workflow code generator 110a generates executable code from the workflow model inputs received from the application building system; the App Entry Point Code Generator 110b generates a method by which to execute the code-generated workflow model; the Object Init Code Generator 110c transforms data into code that initializes an object in the executable code; and the XHTML Code Generator 110d generates executable code that has the same functionality as the user-interfaced described with XHTML. The Localized Strings provide a resource that could be referenced in the user-interface to support localization. The Image Converter performs image transformations so that the images are compatible with the rendering software on the client.

The Workflow Classes, Application Entry Points, Object Init Classes, and View Classes shown in FIG. 6a represent source code input for the JAVA programming language compiler 120. The JAVA programming language compiler 120 generates binary executables that can be interpreted and executed by a java virtual machine.

The JAVA programming language code generator example shows the code generator portion 110. For the JAVA programming language, there is still the issue of generating code for a particular profile (API). So, various libraries get passed into the JAVA programming language compiler 120. The compiler 120 is configured differently depending on the intended output. In a C code generator case, the system would use the C compiler that would be required to build applications for that particular device. The compiler would also be configured differently.

Figure 7:
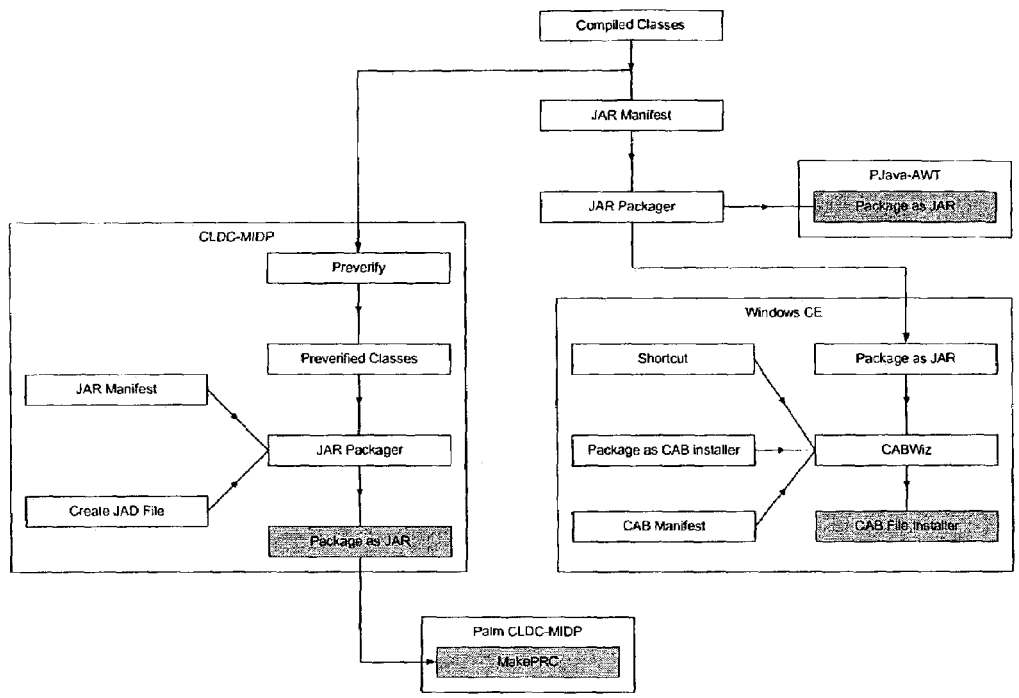
FIG. 7 is a block diagram illustrating the packaging of a JAVA programming language application for a CLDC-MIDP profile and a PJava-AWT profile in a WINDOWS operating system CE device.

The next major phase after code generation is application packaging, i.e., all required files generated as described in FIG. 6a are gathered and packaged into a single file. FIG. 7 illustrates the packaging of a JAVA programming language application for a CLDC-MIDP profile and a PJava-AWT profile in a WINDOWS operating system Windows CE device. In a code generated C output, application packaging would involve various linker stages and packaging into an installer.

As shown in FIG. 7, the Compiled Classes block represents the resulting files from the JAVA programming language compiler; the JAR Manifest block represents a file used by the JAVA programming language JAR packaging utility that describes features of the files in its contents; the JAR Packager blocks represent a standard JAVA programming language JAR packaging utility; the CLDC-MIDP block represents the packaging steps for a CLDC-MIDP client; and the WINDOWS operating system CE block represents the packaging steps for a WINDOWS operating system CE client The CLDC-MIDP block includes a Preverify block, which represents a standard JAVA programming language utility to perform static verification to JAVA programming language class files before being loaded onto a client; a Preverified classes block, which represents the output from the preverify utility; a the JAR manifest block, which describes features of the files to be packaged; a Create JAD file block, which represents a standard descriptor file of the JAVA programming language MIDP package. The Make PRC block represents a utility that generates a PRC file that can be used on PALM operating system devices. The PJava-AWT block represents the packaging steps for a PJava client, which includes using a standard JAR packaging utility to packages all relevant files. The WINDOWS operating system CE block includes a Shortcut block, which represents a WINDOWS operating system Windows CE shortcut that can be used by the user to launch the application; a Package as a CAB installer block, which provides all the required files that is to be installed on the WINDOWS operating system CE client; a CAB manifest block, which represents definition files for the MICROSOFT cabwiz utility that allow the utility to identify which files to package and where to deploy on the WINDOWS operating system CE client, and a CABWIZ block represents a MICROSOFT utility used to create cab files that can be used on WINDOWS operating system CE clients to install applications.

Figure 16:
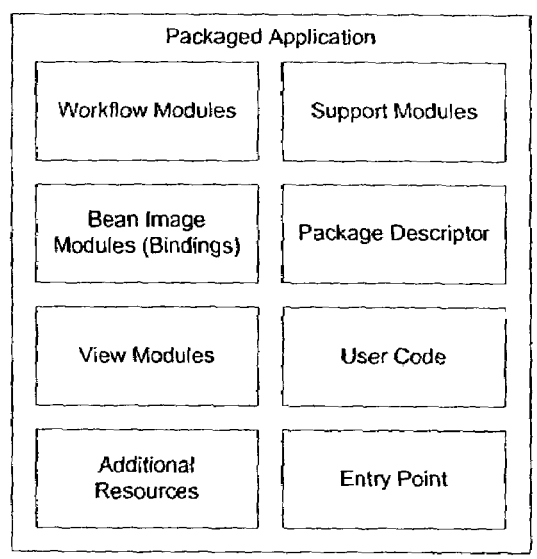
FIG. 16 illustrates various modules that are part of a packaged application.

FIG. 16 shows the various modules that may be part of a packaged application. The application package is a package that is recognized by the platform on which the application will run on. Examples of this include the SUN JAVA programming language "JAR" or the MICROSOFT WINDOWS operating system "EXE". The workflow modules are the code generated and compiled results of the workflows. The bean image modules are the code generated and compiled results of the bindings (described below in the Bindings section). The view modules arc the code generated and compiled results of the user interfaces (described below in the View section). Additional resources are miscellaneous resources used by the application such as graphics files or data files. Support modules are pre-compiled modules that will be used by the various code-generated modules. These contain utility functions to perform tasks that might be common to multiple modules. The package descriptor is a type of manifest that describes the contents of the package, how it is executed, and the like. The package descriptor is a platform specific entity. User code is additional custom code that a developer has created to be used by the application. The entry point module is the starting point of the application that eventually invokes the functionality of a workflow (as described below in the Entry Point section).

Application deployment is the final step of making an application run on a device. Note that application packaging and deployment steps are specific to the various development environments and hardware platforms, and are outside the scope of the present discussion. However, some unifying build tool should exist to ensure that the correct steps are executed to successfully build an application. One implementation is to use a build tool called ANT. Alternatively, a makefile-style build system can be developed. This is one implementation so that the various steps in code generation, packaging, and deployment can be separated rather than to build a large monolithic code generator application.

Figure 9:
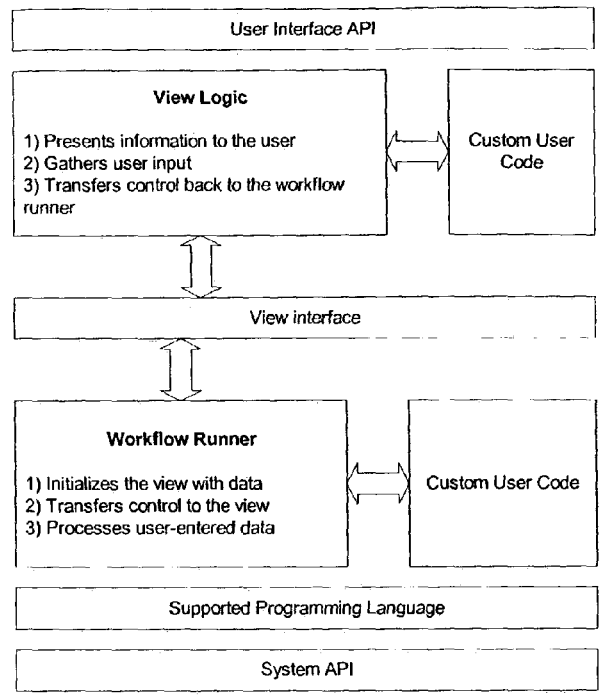
FIG. 9 is a block diagram illustrating the code generated by the workflow code generator of the present invention.

In the preferred embodiment, the code generated by workflow code generator 110 may be partitioned into three different parts, as shown in FIG. 9. The workflow runner (controller) interacts between the view and any data logic. Communication with the view is provided through a thin interface. The interface is intended to insulate the workflow runner from the specifics of how the view is presented and how data is gathered from the user. Custom user code is used to extend the workflow as it is used to extend the view. While generating code by use of generator 110, users should try not to tweak the generated code so that the model-view-controller paradigm is maintained. The custom code should be used only to enhance the limitations of the code generator.

The view is the part of the application that is most likely different for each platform. This is because each hardware/software platform can have vastly different ways of presenting and gathering information from the user (the user interface API). The workflow code generator, however, has a less heavy reliance to the system API. It merely integrates the view with the data. Code generation of the view uses XHTML as the basis where it performs data transfer similar to how HTTP works. Rather than using an XHTML browser, the generator 110 generates code so that the application designers can tweak the code to exploit maximum functionality of the platform. The view interface works similarly to how HTTP works. That is, the view is created; the user interacts with the view; and data returns name-value pairs to the workflow.

The data (model) portion of the application is preferably custom code. Although commonly used model interfaces (such as HTTP and SQL) can be provided, interaction with other data may be custom. As such, little code generation is done for the data. The only parts to be code generated are the static bindings. For example, in the JAVA programming language, if a virtual machine supports reflection (determination of methods at run-time does not exist), then the system statically binds the names at compile-time.

Code Generation for JAVA Programming Language Example

One utility of workflow code generator 110 is to take applications developed using the workflow paradigm described in the '623 application and allow them to run without requiring an application server to host the application. The end goal of this is to take a real-time connected mode application and make that application run in a disconnected client hosting a JVM. Code generation becomes desirable to optimize for size, optimize for speed, and get around some of the other restraints that are imposed while running on a device with less functionality.

The example generated code fragments are for the JAVA programming language. However, this can be extended to other languages as described below. The workflow code generator examples use the CLDC profile. This is essentially a subset of the JAVA programming language and is supported across the various profiles in J2ME. For the view code generator, example code fragments are provided in both AWT (abstract windowing toolkit) and MIDP (mobile information device profile). AWT and MIDP are different APIs that are used in different JAVA programming language profiles.

General Code Generation Method Example

Figure 8:
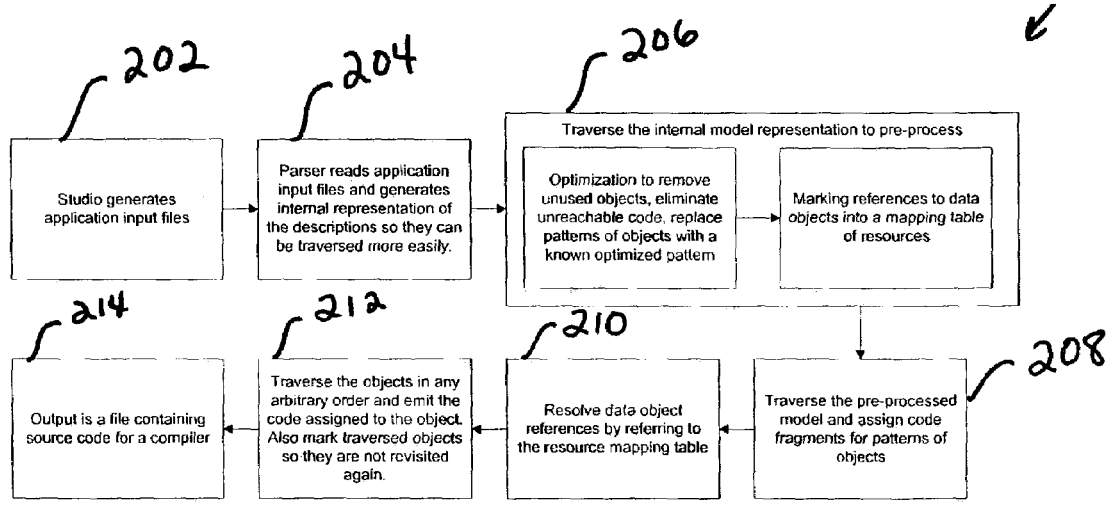
FIG. 8, is a block diagram illustrating a method for generating executable code, according to the present invention.

FIG. 8 illustrates one embodiment of a method 200 for generating executable code, according to the present invention. Method 200 includes the following steps: (i) in step 202, application input files are generated, e.g., by a multi-modal and multi-channel building application; (ii) in step 204, a parser reads the application input files and generates an internal model representation of the declarative statements (or descriptions) so that the files may be traversed more easily; (iii) in step 206, the code generator traverses and pre-processes the internal model (this may include the sub-steps of optimizing to remove unused objects, eliminating unreachable code, replacing patterns of objects with a known optimized pattern; and marking references to data objects into a mapping table of resources); (iv) in step 208, the code generator traverses the pre-processed model and assigns code fragments for patterns of objects; (v) in step 210, the code generator resolves data object references by referring to the resource mapping table; (vi) in step 212, the code generator traverses the objects in any arbitrary order and emits the code assigned to each object (and may further mark traversed objects so that they are not revisited again); and (vii) in step 214, the code generator outputs a file containing source code for a compiler.

Although the present invention will be primarily described in relation to a method 200, it should be appreciated that each of the portions or blocks illustrated in FIG. 8 (as well as the portions or blocks illustrated in the other Figures) may represent the hardware and/or software utilized to perform the logic steps or processes. It should further be appreciated that any one or more of the portions or blocks shown can be implemented in a computer readable medium as part of a system. In the preferred embodiment, conventional hardware, software and/or firmware may be used to perform the logic steps and/or processes.

General System Architecture Example

Figure 10:
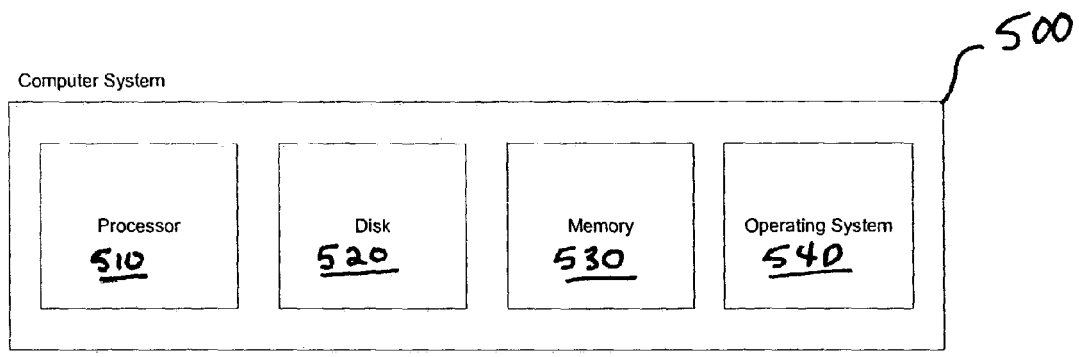
FIG. 10 is a block diagram illustrating a computer system on which the code generator of the present invention may be implemented.

FIG. 10 shows a computer system 500 on which the code generator of the present invention may be implemented. System 500 may represent a conventional and commercially available computer system or an independent microprocessor-based system built specifically for use with the present invention. System 500 comprises a processor 510, a persistent storage device or disk 520, volatile and non-volatile memory unit 530, and an operating system 540.

Figure 11:
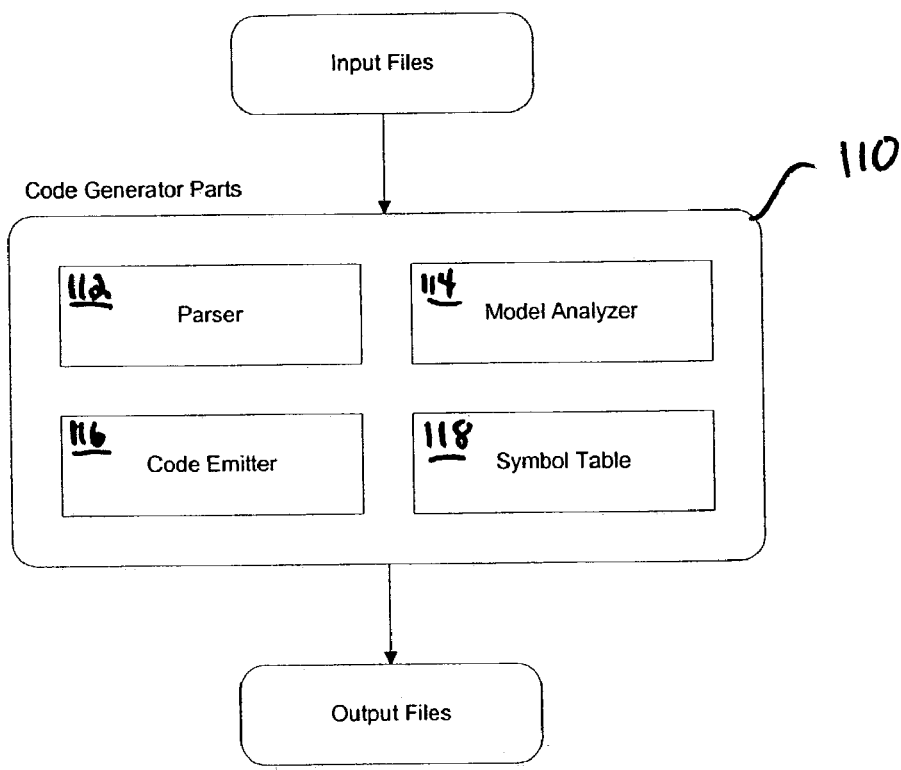
FIG. 11 is a block diagram illustrating the various functional modules or components of a workflow code generator, according to the present invention.

FIG. 11 illustrates the various functional modules or components of a workflow code generator 110, according to the present invention. In the preferred embodiment, the workflow code generator 110 may reside on a disk (e.g., disk 520) in the system shown in FIG. 10 until it is ready to be executed. When the code generator is ready to process input, the operating system 540 loads the code generator into memory 530. The processor 510 then executes the code required to perform the code generation.

The components of the code generator 110 include a parser 112, which reads and interprets input files; a model analyzer 114 that further processes the parsed file to detect errors, perform optimization, and prepare for outputting the result; a code emitter 116 for outputting the results; and a symbol table 118 for storing references to resources that have been used by the input application.

Figure 15:
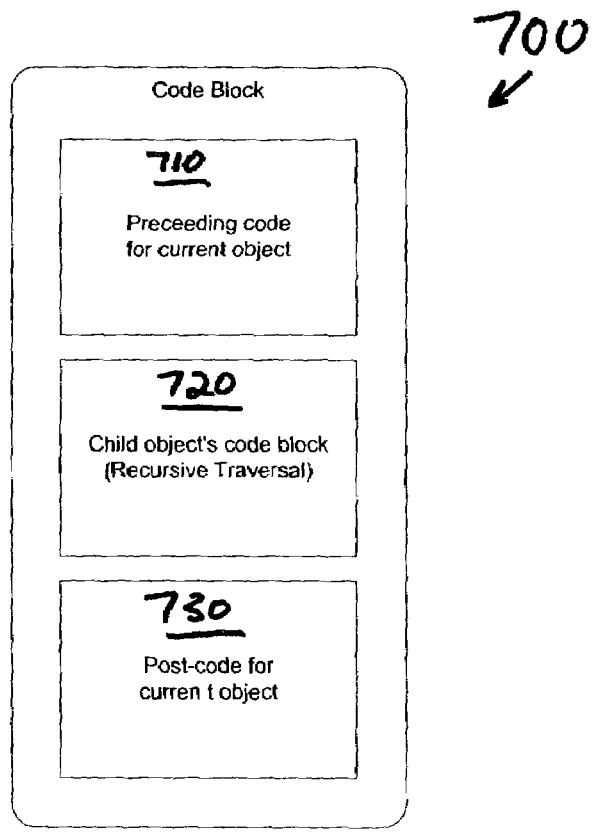
FIG. 15 illustrates a basic code structure that the code generator of the present invention may emit as it traverses a parsed and processed internal model.

FIG. 15 shows the basic code structure 700 that the code generator may emit as it traverses the parsed and processed internal model. There are three sections to the code block 700. The first piece of code 710 will contain the essential structures and functions for a particular application object. This generated code is the primary function of this code block. The second piece of code 720 is a recursive traversal to emit the code for children of this code block. The code generator will traverse to the child of the current object and then generate code in the same way as described by this paragraph. The third piece of code 730 ("post-code") generates code that ensures the syntax of the target output computer language is maintained. It also performs any cleanup of data structures as well as output any additional code required by the previous two code blocks.

Details of Code Generation Process

In the first step in code generation, the code generator reads the input file and converts the declarative statements into an intermediate form that is more easily understood by using machine code.

The workflow code generator will generate code from XML files called CML (Controller Markup Language). The file is essentially an XML-ized in-memory image of the objects that comprise a workflow. Such objects include workflow variables, states, transitions, and the like. This CML file is generated with code and read back in using its companion code. Its format is well suited for duplication of the same objects in memory.

However, during the code generation process, the code generator does not need to create instances of these objects. In some cases, it may not even be possible to do so. In addition, as objects change properties and names, the CML file may also change since it is tightly coupled to the properties of the objects it is representing.

To make the task of parsing CML easier and to insulate the code generator from changes in the CML file, the CML file is transformed into an intermediate markup language that is simpler to parse. This transformation can be performed by using an XSL transformer. From this intermediate markup language, we can generate a DOM tree of the parse results. The reason for this is so we can use the DOM tree as our parse tree directly without having to create our own tree.

This preparation process involves running the CML document through an XSL transformation document, whose result is the intermediate markup language/parse tree. The code generator will then act on the parse of this free rather than on the CML directly. Minor changes to the CML file can then be handled by modifying the XSL stylesheet to transform the document rater than modifying JAVA programming language code to do different parsing.

The result of this transformation is a tree of nodes with parent-child relationships. For example, the children of a node would be all the objects that belong to that particular node. An example is that a workflow state contains several actions to perform while in that state. An extension of this is to form a graph-based structure rather than a unidirectional tree for traversing. This graph would contain the traversal links between objects. The graph would allow for more sophisticated analysis and testing using standard graph algorithms such as spanning trees and loop analysis.

As part of parsing the input document that contains the workflow declarations, the parser will detect any simple syntax and structural (grammar) errors. The next step is to detect inconsistencies in the workflow (semantic errors). These errors include references to resources that have not been defined. This is discovered while attempting to resolve resource references as described below.

Another problem that may be discovered is the definition of states that are "unused" in the workflow. These are states that have been defined but have no references to that state so that control flow cannot enter that state. This type of problem may be discovered by examining all of the states in the workflow and determining if a link (control flow) connects to the state in question. This may generate a warning as opposed to an error because the workflow will still function whether the unreachable state exists or not.

Unreachable code (actions) in a state may also generate a warning where the unreachable code does not affect workflow functionality. The only way by which this can happen is when a transition to another state will occur before the actions in question occur. The code generator can determine if the transition will always occur by checking whether there is a condition on that action. If there is no condition, then the transition will always occur. Once the intermediate model is created and parsed for errors, the code generator can perform optimizations to trim code size and enhance execution time.

As part of the error discovery process mentioned above, the code generator may look for unreachable objects An unreachable object (state) is determined in the following manner:

1. Discover all states that need to be examined (simple enumeration of the intermediate model described above).
2. Traversing through this list of states one at a time.
   a. On each state, look at each transition assigned to the state.
   b. For each transition, mark the state to which the transition traverses. This can be done by annotating the node that represents the state or by creating a list where the names of the states that are traversed to can be stored.
3. When done traversing through the list of states, compare this list with the list of state names that are traversed to. For each state that does not exist in the traversal list, then that state can be safely eliminated from the intermediate model.

Unreachable code (actions) within a single state can also be optimized such that these unreachable actions are eliminated. This may be performed in the following manner:

1. Walk through the list of actions within a state. These actions include the transitions that occur.
2. For each action, if it is not a transition, then continue to the next action.
3. If it is a transition, we check if it has a condition on that transition. If it does, then continue to the next action.
4. The transition does not contain a condition. So, if there are actions that follow this transition, then we can safely remove those actions from the state.

For more extensive optimization, the code generator can analyze a graph to look for patterns of nodes and replace these patterns with optimized node patterns or generate specific inline code that has the same functionality of the set of nodes. This may be performed in the following manner:

1. A list of patterns containing state-transition-state is loaded.
2. Walk through each state in the workflow.
3. On each state, if one of the patterns matches, then replace those patterns with the optimized state-transition pattern. If the code generator opts to use inline code rather than replace with the optimized state-transition pattern, then it will replace the matched pattern with a single state. That state will be annotated with the optimized inline code to emit.

Before the code generator generates code, it gathers all of the resources used and marks the intermediate model in such a way so that when it traverses through these nodes again, it can resolve the references in a manner that is compatible with the generated code that it outputs.

While traversing through the states, the code generator may discover the various resources that are used. This can be done because the actions contained in the states refer to resources in a known manner. The resources that will be used in this case are JAVA programming language objects. References to these objects by the actions are recorded into a mapping table. An example of this mapping table includes a "key" or an index to a list of properties about that JAVA programming language object. The key could be the name of the referenced resource (e.g. variable name)

Where the resource was used, the code generator refer to the resources using a "key" that will point to the appropriate resource in the mapping storage rather than using the original resource. This key will be embedded as an annotation to the object using the resource.

Once the code generator is done traversing through all of the states, it can begin emitting code. First, the code generator will assign code fragments to the various objects in the internal model. To do this, the code generator will traverse the tree of objects. The code generator then compares the object and its relationship in the tree against a mapping of object types to code fragments. The code fragments themselves are incomplete, but put as a whole, they form the application. (Details on specifics of what gets generated are described below.) Note that the code generator need not follow any specific order on which states are visited first. In the context of a tree, the code generator will do a breath-first traversal where the parent is generated and then its children. This is the only requirement in order to establish the correct relationship between parent and children. The code generator assigns the appropriate code fragments as annotations to the nodes.

Some of the objects require resources to be resolved. That is, they require the final source code equivalent on how to access the resource using the target-generated language. The resource-mapping table is now used to add the appropriate code to the access the resource. So, when a resource is referenced using a "key", the code generator will access the resource-mapping table to retrieve the appropriate code fragment. Then, the code generator replaces the reference with that code fragment.

After all the code assignments are completed, the code generator emits the code to an output file. Depending on the target Language, the order by which code is emitted may be important. For example, in the JAVA programming language, the correct resources (JAVA programming language packages) should be imported only at the top of the file. So, the code generator may go through the list of resources in the resource-mapping table to emit this code first. Then, the code generator can walk through the list of states and output the code fragments that have been assigned to them. Since the languages might need certain structural elements to be outputted to form valid computer code, this should be taken into account in the generation. Such constructs include matching curly braces, parentheses, quotation marks, and the like. To help with this, each object has a pre- and post-code fragment assigned to it. The order will be to output the pre-code fragment, the code fragments of its contained children, then the post-code fragments. (Also see FIG. 15 and accompanying text).

Code Generation to the JAVA Programming Language Platform

One embodiment of the code generator is to emit JAVA programming language code. The examples in this application specifically refer to the JAVA programming language platform. As such, certain JAVA programming language platform specific specifications must be maintained in order for the generated code examples to function correctly. Below is a description of some of the procedures where the code generator can adhere to the JAVA programming language specification.

1. JAVA Programming Language Packages

Code generated for Submodels may exist in a package called "models". This is to avoid identifier name collisions that may be possible between generated classes. The code generator may lump all the generated code for submodels into the same package because the application running system may require that different submodels have different names. (It should be noted that this is in contrast to the SUN recommended naming convention of "com.orgname.pkgname . . . " The reason for this is that all symbol information is stored within the class files. The longer the identifier names, the more memory the classes occupy. Wherever possible, the identifier names are kept short.) An optional step after the builds is to run the classes through a code obfuscator to further reduce symbol names.

Because the application designer may have created custom classes in a project that exists in other classes, it is desirable to ensure that the fully qualified class names are used wherever there is a need to refer to a class. This is recommended as opposed to blanket import statements such as import java.util.*;
import java.awt.*;

The reason for this is that blind imports, such as those shown above, have the potential for class name collisions as they are referred to within the generated code. In the example above, the "List" class exists in both packages. If "List" was used rather than its fully qualified class name, then a compile error may occur. Thus, in the preferred embodiment, the code generator avoids the "import" statements and uses fully qualified class names.

Using fully-qualified class names has the disadvantage of making the generated code a bit more difficult to read for a human because the names are often long and often wrap to one or more lines. However, the actual compiled code will not result in any size differences when compared to using import statements.

The code generator can optionally determine which packages get used and generate import statements for those. However, all this is optional and mainly to improve code readability.

2. Default Packages and User Classes

One potential problem may occur when placing the generated classes into packages. When they exist in a different package, the generated classes will not have automatic visibility to classes that have been defined to be in the default package. Unfortunately, some users may create classes that exist in the default package. These classes do not have package identifiers. Hence, the code generator cannot refer to them using their fully qualified class name since that name is the same as the class name.

To solve this problem, the code generator keeps track of all the class names that have been referred to during submodel code generation. When the parse is done, the code generator has a list of the class names. The fully qualified class names that do not contain a dot ('.') in the names mean that those classes are in the default package. Hence, the code generator may specifically import those classes with the "import" statement.

The Workflow Code Generator

The workflow code generator 110a will generate various code modules as described below. Each code module can interact with each other and form the basis of the application. Note that the example code fragments and references to code have the JAVA programming language and runtime platform in mind. However, the same processes can output code to different platforms as well.

Figure 6B:
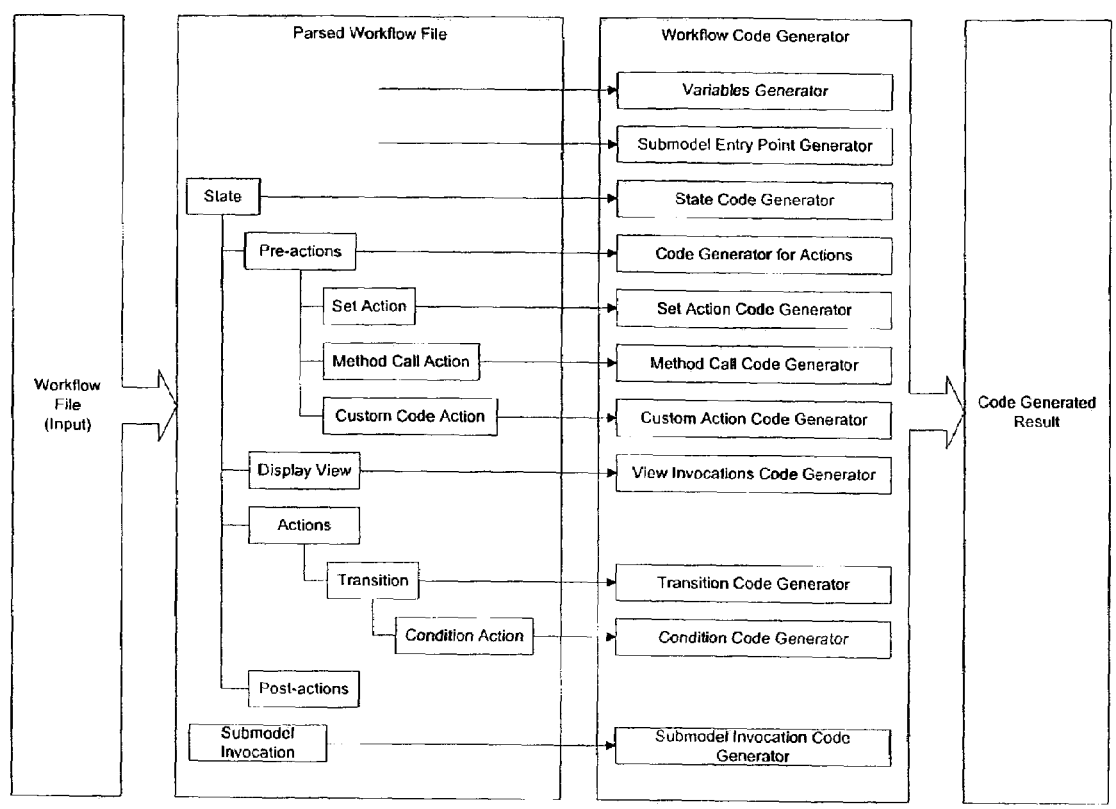
FIG. 6b is illustrates sub-code generators of one embodiment of a workflow code generator, according to the present invention.
Figure 12:
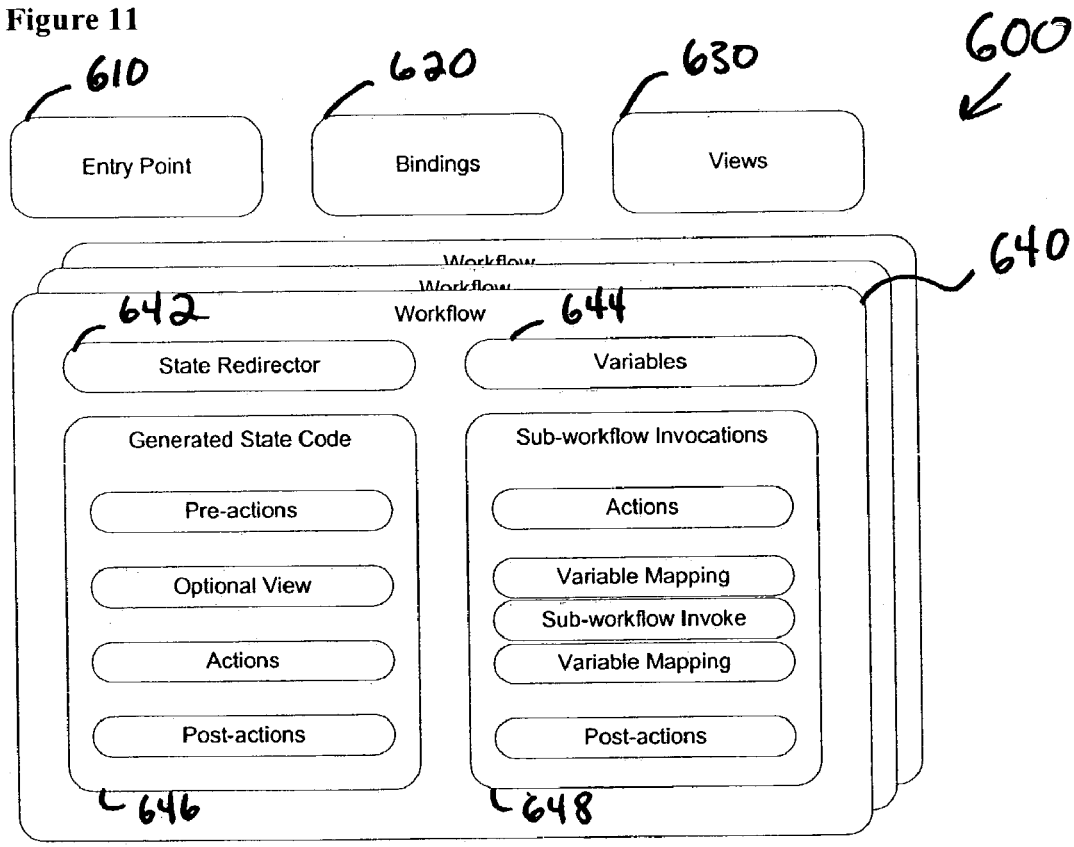
FIG. 12 is a block diagram illustrating various components that may be generated by one embodiment of a code generator, according to the present invention.

FIG. 12 shows the various components 600 that may be generated by the code generator 110 for a workflow based application in one embodiment of the present invention. FIG. 6b shows various sub generators that are part of workflow code generator 110a that respectively generate various components of FIG. 12. The application entry point 610 (described below) is a code module that allows the operating system 540 to find the starting point of the code generator application. The bindings module 620 (described below) allows data to be associated with a newly created application object (i.e. initialize a newly created object). The views modules 630 (described below) are code modules that are used by the workflow to present a user interface for an end-user to interact with the application.

The workflow module 640 represents one complete workflow (i.e. submodel), which is a subset of an application. For the workflow to execute, the code generator 110 generates several components. The state redirector module 642 allows the application to determine where the application states are located inside the generated computer code. These are jump points to execute the code contained in the workflow states. The variables module 644 is a storage module that stores variables used by the workflow application.

The code generator will emit code for the states (see e.g., Generated State Code 646, which is described below). The code for the states may contain several sub-modules. An optional view module is inserted when a user-interface is to be associated with a particular state. This code will invoke the "Views" module that exists outside of the workflow. The pre-actions, actions-, and post-actions refer to action blocks, as described below. They are sub-modules to perform an activity within a workflow state.

The code generator may generate a "sub-workflow invocations" module 648 in order to make a call to another workflow module. A sub-workflow sub-module is similar to a "state" sub-module. However, the pre-actions and actions of the state sub-module are merged into the "actions" block. This is done because the view invocation between the post-actions and actions do not exist for a sub-workflow. So, the two action blocks can be merged. To perform the sub-workflow invocation, two variables mapping modules are generated before and after the workflow invocation (see description of Submodel Variables Mapping section below). The variables mapping modules are designed to map the variables from one workflow to the workflow that is called and vice-versa.

1. Code Generation for Submodels

The application building system 100 (e.g., the system as described by application '623 outputs the workflow application as a CML file. The code generator reads this file to output code. Each CML file represents a workflow in an application. An application's workflow revolves around the workings of submodels. A submodel consists of states and transitions between states. As transitions occur from state to state, actions can occur, which form the basis for the application. Below describes the process by which the code generator will generate output for a submodel.

In the full-blown workflow runner (e.g., the system described in the '767 application), a workflow is comprised of a series of objects that interact with one another. This is a powerful paradigm for a resource rich environment. However, in an extremely resource constrained environment, it is desirable to reduce the number of objects that are created and managed. So, when possible, the code generator favors generating inline code as opposed to creating a new object. Whereas the feature rich application running system described in the '767 patent requires many objects to exist for a workflow to run, the code-generated version may use one primary object. Other objects that are used may be transient objects with very short lifetimes.

One workflow submodel in the code-generated version is a single class. This class may extend from a "Submodel" class. The "Submodel" class may contain support methods that all workflows might need to use. Since creating new instances of a submodel does not create duplicate methods, this is a resource efficient way to easily share helper functions specific to running a workflow.

Note that submodels will be part of the "models" package to avoid name collisions as code is generated.

2. Code Generation for Submodel Entry Points

A submodel will be required to implement one method that will become its entry point. The method may create a variables map to store submodel variables that map viable name to a value. In one embodiment, a Hashtable data structure is used because it exists in all JAVA programming language profiles and configurations. Note that a Hashtable mapping may be used rather than code generation to create variables because the application is allowed to dynamically add variables and also change the class type of variables. This may not be handled during compile-time. The variables map may be returned to the caller to handle variable mappings between submodels. Variable mappings allow variables from two submodels to be passed between them. The submodel entry point is a code module that is generated within the context of the submodel.

3. Code Generation for Variables (Primitives)

Variables that are used in a submodel are essentially JAVA programming language objects. However, there are instances where JAVA programming language primitives (e.g. int, boolean, char) can be used. In a CDC environment where reflection is available, this is not a big issue since the code generator may wrap the primitives in a JAVA programming language primitive object wrapper in the java.lang package. Then, the code generator can blindly pass these objects into a reflected method.

In a CLDC environment, the code generator will generate code for methods that require primitive types to be passed in. There are two actions that the code generator may take to generate the correct code. In the CML file, everything is represented as strings. Thus, the code generator may first determine the collect method to call. The code generator may do this by going through all the potential matches for a method since methods can be overloaded. Once found, the code generator may then generate code to either create a JAVA programming language primitive wrapper or pass the parameter into the method directly, depending on the method signature. For JAVA programming language objects, the code generator need not do anything else, as it will cast the result to the desired class type. For primitives, the code generator will cast to the primitive type to ensure that it is passing in the correct type.

4. Code Generation for State Traversals

In the application running engine (e.g., in the system described in the '767 patent), each state is represented by an instance of a state object. Since it is desirable to avoid creating too many objects, the code generator creates a single submodel object instead. That submodel may contain the states. The states will not exist as objects. Instead, they will be represented as methods. In the JAVA programming language, there is no "goto" type of statement and the other constructs of break/continue to a label are not recommended. So, the code generator uses methods for states and calls other state methods to make transitions to other states.

One issue is that a method call results in a new frame created on the call stack. As calls occur, the stack grows. And the nature of a method call is that call will eventually return, resulting in an unrolling of the stack. This is not desirable behavior.

The solution is to have a central controlling method that delegates transitions to the appropriate state method call. When the state is done, it will return back to the controller method, passing it the next state to which it wishes control to traverse to.

```
public Hashtable entry( ) {
    map = inVar;
    // -1 == exit
    // 0  == null
    // 1  == state
    int s = s1( ); // Start
    while (s>0) {
        switch (s) {
            case 1: s = s1( ); break; // Start
            case 2: s = s2( ); break; // Show
            case 3: s = s3( ); break; // Pick
            case 4: s = s4( ); break; // Welcome
        }
    }
    return map;
}
```

Figure 13:
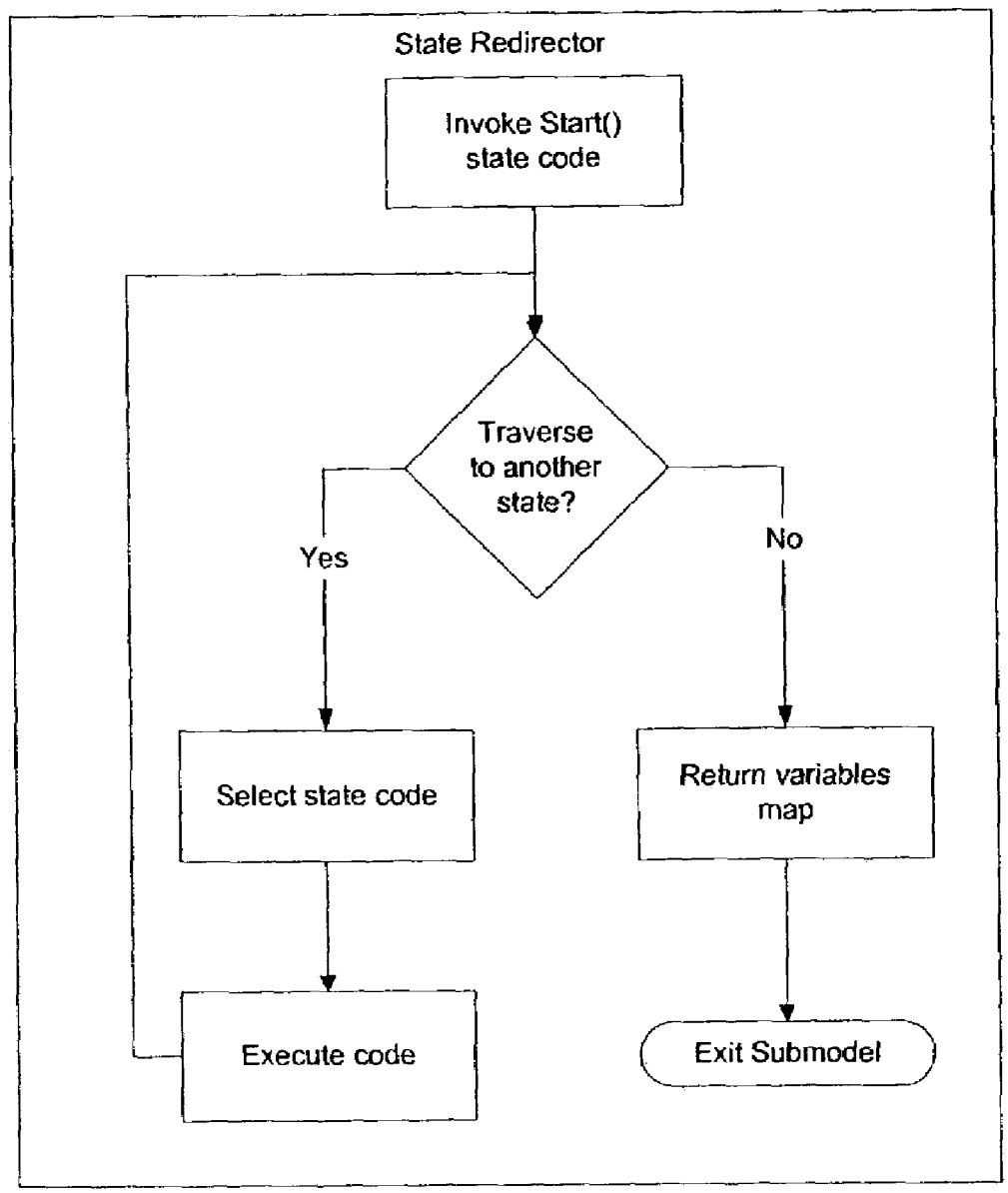
FIG. 13 illustrates one embodiment of a state redirector module for determining how to invoke the various state modules in a workflow.

The above code fragment is a sample of what the controller method might do (see FIG. 13). It is contained within the submodel entry method. One thing to notice is that the state names have been remapped to names m the form of "snnn". This was done in order to convert free-form names in the CML file to legal JAVA programming language identifiers. One possibility is to replace invalid characters with valid ones such as underscores. However, doing this will result in potentially long names for the methods, which eventually get stored in class files and bloat the class file sizes. Also, there is the potential of name collisions when the code generator starts replacing characters. So, the code generator maps state names to simple names and generates comments wherever the method is referenced to make it more human-readable in the event the user wishes to edit the generated code.

Since the code generator uses numbers for the state names, it can use a switch-case statement to map numbers with the states. The call to each state results in an integer return value for the next state to traverse. The switch-case is contained in a loop that continues executing until the code generator is ready to exit the submodel. The code generator uses defined special constants that tell the controller method what to do. In one embodiment, a value of '−1' will be a command to exit the submodel; a value of '0' is a no-op; and a value of '1' is the start state of the submodel.

5. Code Generation for States

States of the application workflow consist of actions that get executed and an optional view that is displayed to the user for some input, as described in the '623 and '767 applications. Some of the actions will cause a transition to occur, returning from the state method back to the controller method. The code generator will generate code for the states when it encounters a node in the parse tree which is labeled as being a state. The children of states are actions. These are generated using recursion to traverse down the tree hierarchy.

States are generated as methods that return an integer. The method names follow the convention as mentioned above (snnnn). States consists of four discrete steps. First is a pre-action section. The actions in this section get executed as control transfers to this state. The second is an optional view display. The view is intended to display a user interface and prompt for some input. When the view returns back to the state, the actions section gets control. The actions section will execute actions until a transition occurs. If a transition occurs back to the same state, it will not exit the state and return. Instead, it will loop back in the actions section until a transition is made to a different state. Finally, when a transition is made to a different state, the actions in the post-action section get executed. These behaviors are designed to mimic the same behavior found in the application running engine of the '767 application.

6. Code Generation for Action Blocks

Actions are activities that can be performed within a state, as described in the '623 and 767 applications. Actions exist to perform functions that make the application perform as specified by a developer. Actions in the pre- and post-section may be encompassed within a try-catch block to catch any exceptions. If any exception is thrown within these sections, it is ignored and execution continues, just as it does in the application running engine of the '767 application. Of course, if no actions are contained in the pre-/post-block, then no code will be generated for those blocks.

Note that if an action within an action block fails, then the code generator skips executing the other actions in the action block and moves on to the next action block. There are essentially four different types of action blocks, pre-, post-, actions, and transition blocks. In terms of code generation, action blocks are enclosed within try-catch statements.

The main actions block is where the primary blocks of code will reside for a state. It will be generated as a loop that continues to execute until a transition is made out of the state.

Figure 14:
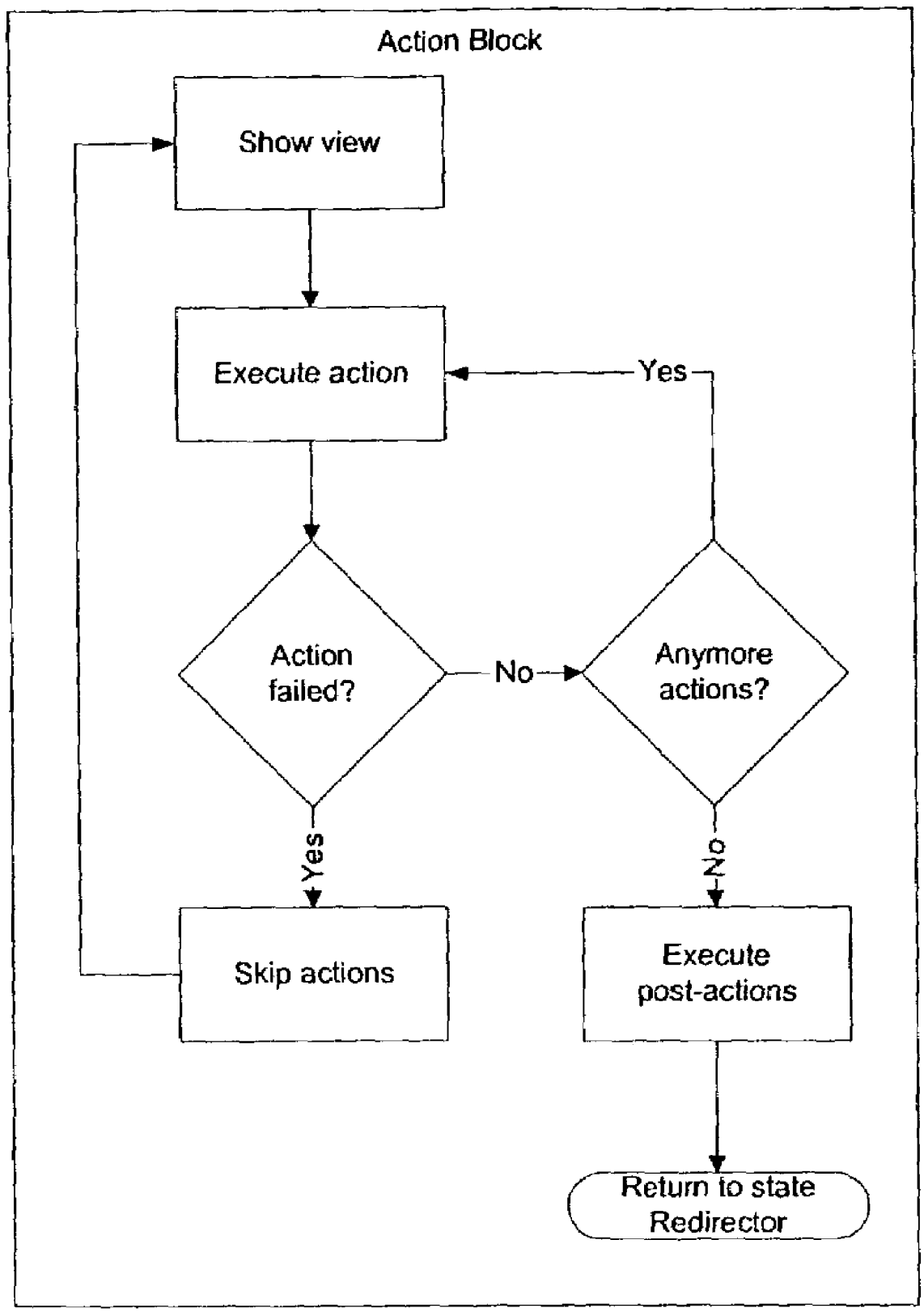
FIG. 14 illustrates one example of an actions block that may be used to generate pre-actions, actions, and post-actions.

The behavior that must be simulated is as follows (see FIG. 14):

1. Show the view and get user input
2. Execute actions that might include acting on some user input
3. If an exception occurs, skip the remaining actions and show the template again
4. If there is a self-loop for the transition, remain within the loop without executing the pre- and post-action blocks
5. If a transition is encountered, execute all actions under the transition
6. If there is an exception in an action within a transition or a condition fails, then continue executing the actions
7. If a transition is successful and it is going out of the state, execute the post-actions block and exit the state

7. Code Generation for View Invocations

The call to show the view is code generated as creating an instance of a transient object and then calling its show( )

method. (See the section on template code generation below for more details.) This is essentially designed to mimic a server's response to the client by sending back a view to the client. At that point, the user interacts with the view and control is eventually returned to the controller, which should then process the user input.

This is a request-response interaction that the application running engine of the '767 application works well with due to the nature of the medium in which it works. In a standalone application, however, the request-response paradigm is an artificial limitation imposed to make the workflow function similar to what the application running does.

Another goal of die design of the workflow code generator is to make it relatively simple for users to customize the generated code and make that code perform as necessary. Thus, the view has interfaces that simulate request variables, which can still be extended to handle passing JAVA programming language objects back rather than just simple strings.

Displaying the view involves creating a new instance of the view. The instantiated view object will be used and then dereferenced so that it can be garbage collected. The reason behind this is because GUIs are by nature, resource intensive. They will typically create several objects and might involve resources such as images. While it may save processing cycles by avoiding the requirement to recreate a view each time the object is used, the price to keep the object in memory is too great considering the type of devices on which the applications will run. The instantiated object can be kept in memory for the lifetime of the state. However, beyond that state, the object should be freed as early as possible to make room in the heap.

Note that once the GUI is visible, control must somehow be passed to the system so that it can process events on the GUI. Unfortunately, this is a JAVA programming language profile-specific property. As a result, different code must be emitted based on the target profile. This will be explained in further detail in the template code generation section (e.g., it will involve transferring control to a different thread and using a wait-notify mechanism to return control back to the workflow).

8. Code Generation for Actions

Actions in the application running engine are method calls on pre-defined objects. To add an action, a user may add a new object that implements a set of interfaces. Then, during runtime, these objects interact with other objects with reflection. These actions are generated by the code generator when they are traversed in a parse tree as a child of the state node. The sections below describe the various actions and the code generated outputs that are possible in one embodiment of this application.

Unfortunately, the interfaces that the actions implement resemble the servlet API and were designed to work within a servlet framework. Also, the actions were designed to have knowledge of the operation of the application running engine. As a result, those objects are not used directly during code generation. Thus, the action set may be a fixed set and cannot be dynamically added without adding code in the code generator.

Fortunately, most of the integration occurs with method calls. Actions are used primarily to navigate between states. The code generator implements four essential (and most commonly used) actions, although more can be added (see class diagram). In one embodiment, actions that involve XML or XSL transforms are not implemented because certain targets are not conducive to load XML parsers or XSL transformers. Also, actions specific to HTTP such as security (HTTPS) and bookmarking (browser stack) are not implemented since the application is not operating on a browser. The log action can be implemented as a debugging feature, but preferably will not be used if there is no efficient storage medium or the resources to store relatively large logs.

9. Code Generation for Set Action

The "set" action in the application running engine is used to copy the values from the HTTP request to the model variable scope. Since the code generator attempts to exactly simulate what happens on the engine, it must also simulate the behavior of the "set" action. This section describes what the code generator outputs to implement the functionality for the "set" action.

Figure 17:
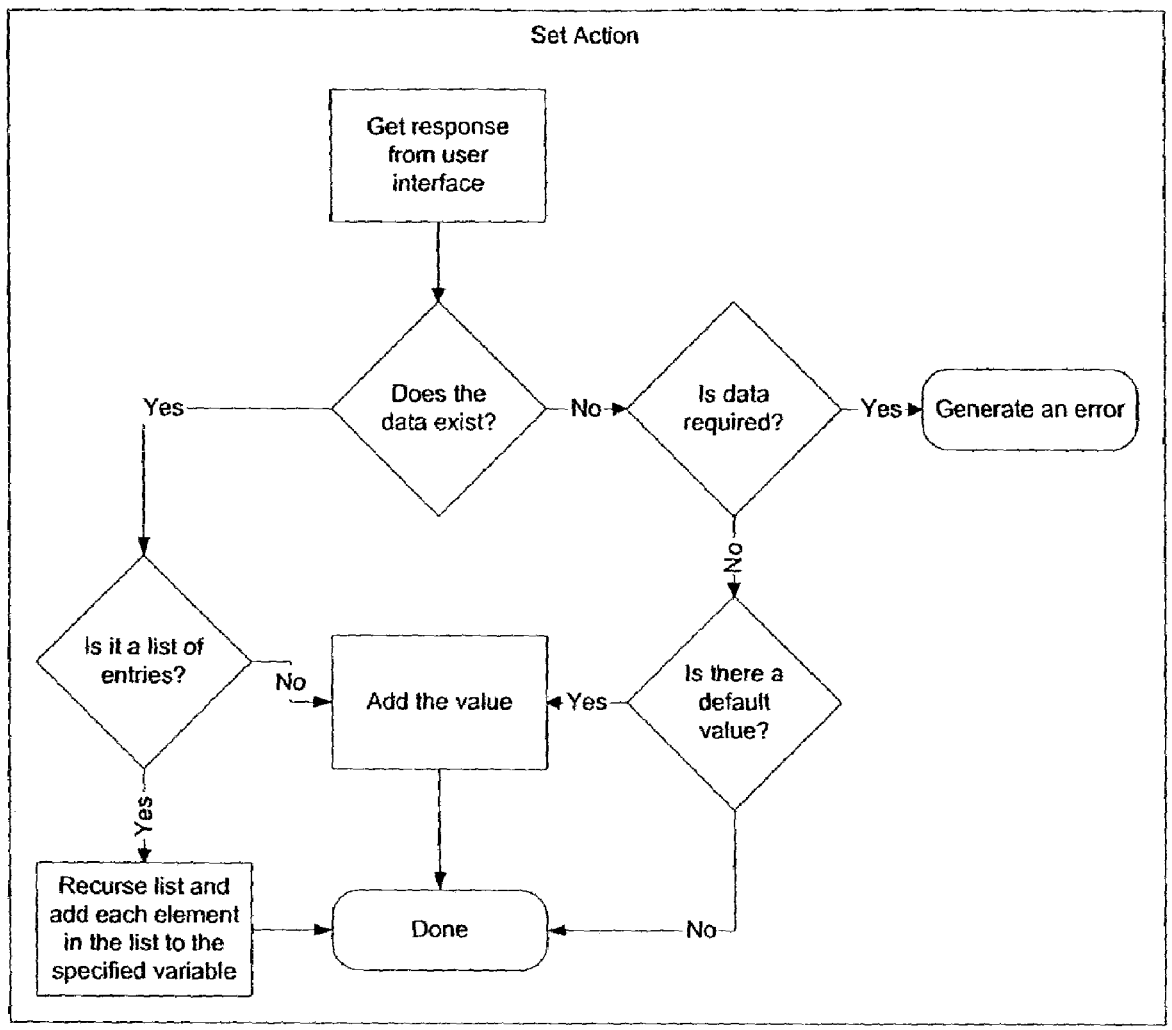
FIG. 17 illustrates one example of the operational flow of a set action, which may be used by the present invention.

The set action operates in three different modes (see FIG. 17);

(1) Required assignment—if the specified request variable does not exist, it generates an error and causes the execution block in which the set action resides to fail;

(2) Optional assignment—if the specified request variable does not exist, it skips the assignment and continues with other actions; and (3) Default assignment—if the specified request variable does not exist, it assigns the model variable with a specified default value.

In the application running engine, the values passed between browser forms and the engine are string values. In addition, the user is allowed to enter string values for the default field. To allow for assignment to types other than strings, the code generator may also detect the type of the variable being assigned to and then convert the text element to a type acceptable by the model variable:

Primitive types (byte, char, short, int, long, float, double)—take the string value and convert to the appropriate primitive type. In the event that the conversion cannot be made or assignment does not work, the assignment fails.

Primitive wrappers—convert the string values to the appropriate types and then create an appropriate primitive object wrapper Strings—only a simple assignment is done Collections—append the string to the end of the collection as a string object.

The code required to do all the above checks could become very big, as more and more set actions are code generated. Instead, the code generator creates method calls to helper methods, resulting in smaller code. The helper methods are part of the Submodel base class. The following is sample implementations:

```
public void setVarFromRequest(String modelVar, String requestVar)
throws
CovigoException {
    if (response.containsKey(requestVar)) {
        Object targetObj = map.get(modelVar);
        Object sourceObj = response.get(requestVar);
        if (targetObj!=null && (targetObj instanceof Vector) &&
                sourceObj!=null && (sourceObj instanceof
                Vector)) {
            Vector targetList = (Vector)targetObj;
            Vector sourceList = (Vector)sourceObj;
            for (int i=sourceList.size( )-1; i>=0; i--) {
                targetList.addElement(sourceList.elementAt(i));
            }
        } else {
            map.put(modelVar, sourceObj);
        }
```

```
        } else {
            throw new CovigoException("Request variable" +
                requestVar + "doesn't exist");
        }
    }
}
public void setVarFromRequestOpt(String modelVar, String
requestVar) {
    if (response.containsKey(requestVar)) {
        map.put(modelVar, response.get(requestVar));
    }
}
public void setVarFromRequestDef(String modelVar, String
requestVar, Object defaultValue) {
    if (response.containsKey(requestVar)) {
        map.put(modelVar, response.get(requestVar));
    } else {
        map.put(modelVar, defaultValue);
    }
}
```

10. Code Generation for Transitions

Transitions are essentially action blocks that can contain other actions. Transitions themselves are actions in that they perform some functionality in a state, as described in the '623 and '767 applications. Upon successful execution of all the actions contained within an action block, a transition will occur. This section describes what the code generator outputs to implement the functionality for the "transition"action.

In the preferred embodiment, transition blocks are code generated as try-catch blocks. For example:

```
// Transition
try {
    ...other actions...
} catch (Exception err) { /* ignore or log */ }
```

Transitions are code generated within the pre-, post-, action blocks. Note that transitions do not make sense in the pre- and post-action blocks. So, if a transition is defined in those blocks, an error should be generated. Otherwise, a transition may take the following form:

```
try {
    ...some actions...
    // Transition action
    try {
        ...other actions...
    } catch (Exception err) { /* ignore or log */ }
}
```

There are two types of transitions that are handled by the code generator: a transition to a different state, and a transition back to itself. Transition blocks are contained by an action block, which in turn exists in a loop.

a. Code Generation for Self-Transitions (Subcase of Transitions)

In order for a transition to occur within the same state, the code generator uses the JAVA programming language "continue" statement at the end of the transition try-catch block. This has the effect of skipping the other actions and starting over at the top of the loop, essentially simulating a transition back to the same state without executing the pre- and post-action blocks. Below is a representative code fragment:

```
// Self Transition
try {
    ...other actions...
    continue;
} catch (Exception err) { /* ignore or log */ }
``` b. Code Generation for Transitions to Other States

For a transition to another state to occur, the code must return the integer ID of the state to which control is to be transferred. Since the transition block will be enclosed within a loop, the code generator uses the JAVA programming language "break" statement at the end of the transition fry-catch block to skip the other transitions and exit the loop. Once the loop is exited, the post-action block will be executed. After the post-action block completes, the application returns from the state method back to the state controller, returning the ID of the next state to which control is to be transferred. Below is a representative code fragment:

```
// Transition to another state
try {
    ...other actions...
    next = 123; // 123 is the ID of the next state
    break;
} catch (Exception err) { /* ignore or log */ }
```

11. Code Generation for Method Call Actions

Code generated method call actions perform method invocations on objects in the underlying platform (e.g. JAVA programming language objects). They are designed to work around the limitation of certain JAVA programming language configurations that do not implement the reflection API. Not having this API means that the application cannot dynamically determine method signatures of objects and call those methods. The code generator approach is to perform static compile-time binding.

Instead of performing the bindings as the application runs, the present method performs the binding during code generation. This involves retrieving all the parameters tat are to be passed into a desired method. Note (that the advantage of static binding is that finding the correct method for overloaded methods is not necessary. The JAVA programming language compiler can handle this issue. However, method signatures should still be matched to the submodel variables and constants that will be passed in.

a. Code Generation for Method Call Action (Return Values)

The method call begins with the determination of whether the method will return a result or not. If the method does not return a value, the code generator can continue. Otherwise, the generator will determine if the user wants to assign that value to a model variable or not.

In the case where the user does not want to assign to a model variable, the code generator may check to see if the return value is a "boolean" type. If the value is a boolean type, then the code generator will generate code to test whether the returned result is "true" or "false". If a "false" result is returned, then it will throw an exception to signal that the method call has failed. This is a shortcut in the application running engine that allows conditions to be performed based on boolean return values. If the return value is not a boolean value, then the code generator will ignore the assignment and continue executing the method. Below is a representative code fragment:

```
if (...method call...==false) {
    Throw new CovigoException("Method returned false");
}
```

In the case where the return result is to be assigned to a model variable, then the code generator will save the value to the state's hash table of model variables. Note that the hash table of model variables is untyped. So, a user can define a type for a model variable and have that replaced with a different typed variable.

Before assignment can take place, the code generator will determine whether the method will return a JAVA programming language primitive or a JAVA programming language object. For JAVA programming language objects, the generator can do the assignment without any further manipulation. For example, setVar(variable_name, . . . method call . . . );

For JAVA programming language primitives (boolean, byte, char, short, int, float double), the code generator will wrap the primitive value within JAVA programming language primitive wrapper objects. This must be done because a hash table will be used to store variable values, which only allow objects to be assigned. Below is a representative code fragment:

setVar(variable_name, new Short((short) . . . method call . . . ));

b. Code Generation for Method Call Action (Parameters)

Care should be taken during parameter passing to make sure that the code generator does not inadvertently alter the parameter types and cause a potentially different, overloaded method to be taken. For primitive types, the code generator can just pass in the value directly. For characters, the code generator encloses the first character with single quotes. For java.lang.String objects, the code generator encloses the string within double-quotes. For boolean values, thee code generator ensures the value is either 'true' or 'false'. For the other primitive types, the code generator outputs the string directly into the code and precedes it with a type cast to the correct type. The code generator further ensures that the entered value can fit within the casted primitive data type, such as char—e.g. 'a'
java.lang.String—e.g. "the string"
boolean—e.g. true
byte, short, int, long, float, double—e.g. (short)1234
others—invalid, generate an error. There is no way to pass in an object literal.
Users should have used a model variable containing the object in this case.

Passing in model variables has challenges of its own. The code generator compares the type of model variable versus the type that the method parameter expects. In the event that the parameter expects a primitive data type, the code generator ensures that the model variable value is a JAVA programming language primitive data type wrapper object. If so, then the code generator can call the appropriate "getvalue( )" methods to obtain the literal values to be passed into the method call. The reason for this is that model variables can only contain objects. In order to store primitives, the primitive must be wrapped around their associated object wrapper. For example:

e.g. ((java.lang.Short)getVar("aShortValue")).shortValue( )

For other objects, the code generator ensures that the data type will match the type expected by the method call. After the cheek is completed, the code generator can generate the code to obtain the variable value and pass it into the method. Note that a type cast needs to occur because the getvar( ) method will return a JAVA programming language object (i.e. the hash table variable map is untyped). For example:

e.g. (com.covigo.SomeObject)getVar("myObject")

The following is a sample method call:
//Method call with return value
setVar("ingredients", ((Cocktails)getVarCreate("cocktails", Cocktails.class)).getIngredients((java.lang.String)getVar("index")));

c. Code Generation for Method Call Actions on Objects

Methods call actions act on objects. Before a method call can be made, an instance of an object that is associated with the method must exist. This may be done using the getVarCreate( ) helper method. The helper method looks through the model variables hash table to see if the model variable exists. If the model variable exists, the helper method will return that object to the caller. If the model variable does not exist, then a new instance of the model variable will be created. The getVarCreate( ) method may take two forms, depending on the type of object being created.

public Object getVarCreate(String key, Class factory) throws CovigoException;
public Object getVarCreate(String key, Class factory, llnit init) throws CovigoException;

The first form of the call takes a name of the variable. If the variable exists in the hash table, that variable is returned. If the variable does not exist, a new instance of the variable will be created, using the "factory" argument. Objects get created via the Class.newInstance( ) method.

The second form of the call takes the same first two arguments. The third argument is an init class. This is a class that implements the llnit interface. This type of class initializes the objects created via the "factory". (See the section on bean images for the implementation details.) This function is meant for simulating the times when a variable does not exist and needs to be instantiated and pre-initialized with certain fields.

The code generator will decide which of the two methods to use based on the type of "factory" classes are to be instantiated. During the builds, the code generator will only generate and use class initializers for the proprietary objects. Certain proprietary objects have special requirements that require them to be initialized with correct fields. Examples of this include the SQL data adapter object where some of the fields to be initialized include the database driver, a URL, username, and password.

12. Code Generation for Condition Actions

The condition action is a simple expression evaluator used to perform variable comparisons, as described in the '623 and '767 applications. The code generator does not generate static code to evaluate the expressions because the model variables are not typed (i.e., the class type for model variables can change during runtime depending on the object that gets assigned to that variable). This section describes the code generation process when condition actions are encountered as nodes in the parse tree.

The application running engine does simple comparisons using the following operators in the following precedence:
==, !=, <, >, <=, >=, ||, &&

The user can enter either identifiers or strings on either side of the operator. Identifiers will resolve to model variable names. If an identifier cannot be resolved, then it will be used as a constant (either a string or a number, depending on context and the variable being compared against). Because of these issues, the code generator does not output static code to do the comparisons.

Rather than implement a full-blown parser on the client, the code generator pre-processes the user-entered code into easily parsable tokens. In addition, the code generator uses a stack to put the operations on so that operator precedence rules can be implicitly represented on the stack.

Any simple parser can be used. For binary operators, the code generator pushes the two arguments on the stack and then pushes the operation on the stack. For unary operators, the code generator pushes the argument on the stack and then pushes the operator. The code generator proceeds in this manner for other types of operators like a trinary operator or method calls. Arguments are stored as strings. Operators are stored as integer constants. This list of operations may be stored in an array that gets generated as code. For example, for the expression var1=="value1" && var2<=123, the resulting array will become:

new Object☐ {"var1", "\"value1\"", new Integer(EX-PR_EQ), "var2", "123", new Integer(EXPR_LE}, new Integer(EXPR_AND)};

Note that user entered strings will become generated code. At this point, the code generator escapes special characters and Unicode characters. The double-quote (") and backslash (\) characters must be escaped with a backslash. For whitespace characters (tab, newline, carriage return, line feed), the code generator encodes the appropriate escaped character ('\t', '\n', '\r', '\f', respectively). Otherwise, for characters appearing outside the range of 32 through 126, the code generator escapes those characters using the Unicode escape sequence of '\uxxxx' where xxxx represents the 16-bit hexadecimal value of the character. Otherwise, the code generator outputs the character as-is. The following is a sample implementation of the encoding:

```
private String escapeString(String str) {
    StringBuffer sb = new StringBuffer(str.length( )*2);
    for (int i=0; i<str.length( ); i++) {
        char c = str.charAt(i);
        switch (c) {
        case '"': // Escape double quotes
            sb.append('\\'); sb.append('"'); break;
        case '\\': // Escape backslashes
            sb.append('\\'); sb.append('\\'); break;
        case '\t': // Escape tabs
            sb.append('\\'); sb.append('t'); break;
        case '\n': // Escape newlines
            sb.append('\\'); sb.append('n'); break;
        case '\r': // Escape carriage returns
            sb.append('\\'); sb.append('r'); break;
        case '\f': // Escape line feeds
            sb.append('\\'); sb.append('f'); break;
        default:
            if ((c<0x0020) || (c>0x007e)) {
                // Escape unicode character
                sb.append('\\'); sb.append('u');
                sb.append(toHex((c>>12)&0xF));
                sb.append(toHex((c>>8)&0xF));
                sb.append(toHex((c>>4)&0xF));
                sb.append(toHex( c  &0xF));
            } else {
                // Regular character
                sb.append(c);
            }
        }
    }
    return sb.toString( );
}
```

At runtime, the system may avoid the parse step and directly execute the commands in the list and place them on the stack. Results are placed back on the stack. Evaluation proceeds as follows:

Get a value from the command list.
   If the value is a String object:
   If the value is "null", then push a null on the stack.
   If it is a string constant (with double-quotes), then push the string on the stack (without the double-quotes).
   Next, try to determine if an integer constant exists. If so, convert the string to an integer and push it onto the stack.
   If it is not an integer, try to obtain the value from the request variables. If so, get the value and push it onto the stack.
   If the value cannot be retrieved from the request scope, try retrieving the variable value from the model variable hash table. If successful, push the value onto the stack.
   Otherwise, treat the identifier as a string literal and push it onto the stack.
   If the value is an Integer object, see what the operation is.
   For unary operations, pop a value from the stack, perform the operation on the popped value, and push the result back on the stack.
   For binary operations, pop two values from the stack, perform the operation on the popped values, and push the result back on the stack.
   The final result will be a value on the stack that can be popped off.

Because at runtime it is not desirable to regenerate code to do the evaluation for every expression, the code generator defines a helper method to evaluate pre-parsed expressions. This method will exist in the Submodel class, which is inherited by all submodels, and hence be available to the actions. The method may take an argument that is an array of the commands to execute.

Finally, when the evaluation is complete, the result should be a single element on the top of the stack. That value is popped off and evaluated for being true or false. If false, then the code generator throws an exception so that the state executing the action knows to skip executing the rest of the actions in an action block.

13. Code Generation for Custom Code Actions

Custom code actions are similar to method calls in that the generated code will make a call to a method, as described in the '623 and '767 applications. The difference is that code actions have direct access to the controller variables whereas for the method call action, controller variables must be explicitly passed into the method. The code action is an action that gives the application developer more flexibility in the type of code that gets outputted. So, instead of using the set action or method call action, for example, users can use code actions and write code in the native language instead.

The code that developers will place into the code action call may be specific for a given compiler. For example, if the user enters JAVA programming language code, then the code action can only be compiled with a JAVA programming language compiler and hence will only run on the JAVA programming language platform.

In the example of the JAVA programming language, a code action call appears as follows:

```
(new java_action.StartModel_State1_action0( )).exec
    (this);
(new java_action.StartModel_State1_action1( )).exec
    (this);
(new java_action.StartModel_State1_action2( )).exec
    (this);
```

The above code assumes that there is one custom code action per object and that the executed method is called "exec". In this case, there is only one action per JAVA programming language class. Other implementations could include having all of the methods that are used in the project to begin one class. In this case, the workflow code generator could output something like:

```
(new java_action.actions( )).exec1(this);
(new java_action.actions( )).exec2(this);
(new java_action.actions( )).exec3(this);
```

The methods in these code actions take one parameter that is a reference to the variables. The above examples all reference "this" in the JAVA programming language, which means that the object that contains these action calls contain the variables. Alternatively, these variables could have been kept in some other object.

The reference that is passed into the code action calls includes objects that implement some kind of interface that specifies how to retrieve the variables in the controller. The following is what a sample code action class looks like in the JAVA programming language.

```
package java_action;
import com.covigo.flow.action.*;
import com.covigo.flow.SessionData;
public class StartModel_State1_action0 implements Action{
    public void exec(SessionData sessionData) throws
        Exception {
            sessionData.putValue("result",
                sessionData.getValue("entry", SessionData.
                REQUEST_SCOPE),
                SessionData.MODEL_SCOPE);
    }
}
```

In the above example, an interface called "SessionData" is passed to the "exec" method call. So, when the code generator passes the "this" into the call, this means that the object that calls the code action methods implements this "SessionData" interface. In other words, the object that makes calls to the code actions contains methods to set and get the variables. This example of the "SessionData" interface contains two methods, "putValue" and "getValue".

The "putValue" call takes two required parameters and one optional one. The first required parameter is a "key" to associate with the variable. This is essentially the variable name. The second required parameter is the value of the variable. The third optional parameter is the location of where to store the variable. There are different scopes in the workflow controllers. The scopes include the "REQUEST_SCOPE" and the "MODEL_SCOPE". The "REQUEST_SCOPE" includes all of the variables that reside in a template (presentation or view). The "MODEL_SCOPE" encompasses the variables in the workflow controller.

The "getvalue" call takes one required parameter and one optional parameter. The first required parameter is the name of the variable. The second parameter is optional and specifies the location of the variables (the scope as described above).

14. Code Generation for Submodel Calls

A submodel call is essentially an extension to a state, as described in the '623 and '767 applications. It will be generated as a method call, similar to that of a state. A submodel call has pre-, post-, and action block. Submodel calls do not have views, however. The process that occurs is as follows:

1. Pre-action block actions are executed.
2. Model variable mapping from the current model into the submodel occurs (passing variables to the submodel).
3. A call is made into the submodel, transferring control to that submodel.
4. The submodel executes in its own model variable scope.
5. The submodel finish and exits via the pseudo "exit" state.
6. Control returns back to the calling submodel, passing back the model variables of that submodel.
7. Model variable mapping from the called submodel is performed, mapping values from the called submodel to the caller's submodel.
8. Action block actions are performed.
9. If there is a self-transition, return to step #2.
10. Post-action block actions are performed.
11. Return control to the state controller, which will transfer control to the next state.

a. Code Generation for Submodel Calls (Variable Mappings)

Submodel Variables mapping is the mechanism by which the application workflow passes variables between workflows. Before control is transferred to a new submodel, model variables from the current submodel can be mapped to the new submodel, which is akin to passing variables to a submodel. Once the new submodel finishes execution, it can return values back to the calling submodel by using the same mapping mechanism.

Variable mappings may take a "from" and a "to" argument. Both arguments are essentially identifiers that exist between the current submodel (from) and the called submodel (to). (Note that the directions will be reversed as the submodel returns control back to the calling submodel.) Mappings are essentially assignments as copy by reference. Thus, care is taken not to have any adverse side effects while modifying such objects.

Model variable mappings can optionally take a default value. If the "from" argument is left unspecified or the value of the variable does not exist yet, the default value will be passed to the submodel instead.

Model variable mapping may be accomplished by generating code to call a helper method that is implemented in the Submodel base class. Below is a representative code fragment:

```
Hashtable vars=new Hashtable( );
mapInVar(vars, "from", "toMySubmodel");
mapInVar(vars, "from", "to", "defaultValue");
vars=(new models.MySubmodel( )).
mapOutVars(vars, "fromMySubmodel", "to");
```

Implementations of mapInVar and mapOutVar essentially amount to setting the correct entries in the two different model variables hash table. The following are sample implementations:

```
public void mapInVar(Hashtable inVar, String sFrom, String sTo) {
    if (map.containsKey(sFrom)) {
        inVar.put(sTo, map.get(sFrom));
    }
}
public void mapOutVar(Hashtable outVar, String sFrom, String sTo) {
    if (outVar.containsKey(sFrom)) {
        map.put(sTo, outVar.get(sFrom));
    }
}
```

Supporting Code Generators

Before the generated workflow code can execute, additional code modules must also be generated so that the workflow can exist within the device's environment. This includes an application entry point so that the underlying device platform (e.g. the JAVA programming language) knows how to start executing the first workflow in addition, the workflow might need additional code as covered by bindings. These generated binding code modules provide data that is tied to an object. The workflows also reference code embodied in user-interface modules so that a user-interface can be presented to an end-user for that user to interact with the application.

Application Entry Points

The purpose of an application entry point is to allow the runtime platform (e.g. the JAVA programming language) to run the application. This is a known location for the platform so tat the platform knows the starting point of the application. We use this so that we can start the generated code for the first workflow.

Code Generation for Application Entry Points

Each profile/configuration for the JAVA programming language has different methods of starting an application. This means that code must be generated differently depending on the desired target.

For example, for a CDC application running under AWT, launching an application involves calling a public static method called "main" that takes an array of strings for the command-line parameters. The thread that executes the main( ) method will become the main application thread that runs the workflow. The following is sample code that could be generated to call a workflow.

```
import java.util.*;
public class AppName {
    public static void main(String args[ ]) {
        (new models.StartModel( )).e(new Hashtable( ));
        System.exit(0);
    }
}
```

Compare this to the entry code for a MIDP application. The MIDP application starts with the GUI event thread calling the entry point. It is expected for this thread to return immediately after the application has started. Since this thread is used to handle various system events such as button presses, the code generator starts a new thread to run the workflow.

```
import java.util.*;
import javax.microedition.midlet.*;
import javax.microedition.lcdui.*;
import com.covigo.client.view.midp.*;
public class "+Util.makeIdentifier(sAppName)+" extends MIDlet
implements
Runnable {
    public void startApp( ) {
        if (AbstractMIDPPage.getDisplay( )==null) {
            AbstractMIDPPage.setDisplay(Display.
            getDisplay(this));
            (new Thread(this)).start( );
        }
    }
    public void pauseApp( ) { }
    public void destroyApp(boolean force) { }
    public void run( ) {
        (new models.StartModel( )).e(new Hashtable( ));
        destroyApp(true);
        notifyDestroyed( );
    }
}
```

Bindings and Bean Images

Bindings are used primarily in the presentation. Bindings are essentially method calls that have been mapped to a name. When needed, the caller may simply specify the binding name and allow the binding handle the details of how to call the method and what parameters to pass to that method. One reason for this is to separate dynamic data usage from the details of method calling, which should exist as logic.

In a CDC environment, there exists the capability of doing very late binding through reflection. So, the simple solution for this to happen without having to compile code is to use reflection. In the CML file, all method names and parameters are specified as strings. During runtime, introspecting on a class and looking for the desired method resolves these names. When the method is found, the parameters are created as objects and passed in as appropriate.

In a CLDC environment, there is no reflection. So, the code generator resorts to static binding in which it binds names to methods during compile time rather than run time. (See section on method call actions for further details as to the code generated to make a method call.)

Aside from the details of making a method call, there exists an additional problem of associating a name with a particular method call. One solution is to create a class around each method call and have that class implement a standard call interface. Then, the code generator can create a "static" hash table of name to method call association. There are a few issues with this approach. The first is that the code generator will be using a hash table. Hash tables, however convenient, are expensive in terms of processing and in memory usage. The second is the need to initialize the mapping between name and method call class. The third is that each method call will exist in its own object, which may result in an undesirably large number objects.

The code generator solution is to generate a method within the submodel that takes the name of the binding to execute. If the binding fails or if no binding can be found, it will return the name of the binding. Otherwise, it will return the object that the binding returns (if any).

a) Code Generation for Bean Images

Bean images are created to initialize newly created instances of objects. On the application running engine, this is implemented as a readObject( ) deserialization call on the bean image file. This will result in an object that has its fields initialized. On CLDC JVMs, readObject( ) is not available. So, the code generator creates code to do object initialization.

```
Object binding(String sName) {
    if (sName.equals("myBinding")) {
        ...execute method...
    } else{ ...
}
```

The example code above avoids creating objects that need to remain in memory during the submodel's life. This is where the binding can save some memory.

During code generation, the code generator determines the type of object and the fields to initialize by using a combination of methods. In he preferred embodiment, the code generator performs as follows:

1. Determine if a bean image file exists that can be read from. If so, the code generator reads from it and creates an instance.
2. Introspect on the bean to obtain all the read/write properties.
3. Generate code to set those properties given the object.
4. If there is no bean image file, see if there is an XML version of the bean image. If so, read from it.
5. Parse the XML document to determine the fields and values to set for the fields.
6. Try creating an instance of the object to better determine what type should be assigned to the properties. If unavailable, then default to assigning strings.
7. If neither of the above is successful, then do not generate code. New instances of the object will be left uninitialized.

One example of bean image code initialization looks like:

```
package init;
import ClassToInitialize;
public class SubmodelName_ModelVariableName_INIT implements IInit {
    public Object create( ) {
        Object o = new ClassToInitialize( );
        init(o);
        return o;
    }
    public void init(Object o) {
        if (o instanceof ClassToInitialize) {
            ...methods to initialize "o"
        }
    }
}
```

Note that bean image inititializers are put into the "init" package to avoid potential name collisions during code generation.

Bean image initializer class names follow a naming convention so that it can be discovered at runtime whether an initializer exists or not. In one embodiment, the names begin with the submodel name that the model variable was defined in, followed by an underscore (_) and succeeded with the name of the model variable name, followed by "_INIT". Below is an example:

public class SubmodelName_ModelVariableName_INIT implements llnit { }

The class also implements the "llnit" interface that defines two methods, create( ) and init. The create( ) method will create a new instance of the object with its fields initialized by init( ).

Code Generator for Templates

The template code generator takes an XHTML file and generates code for the target platform to be able to display the user interface. This may be in lieu of having a browser that interprets the XHTML files during runtime. The advantage of the code generation approach is that the code can be modified by a developer to add additional features that are not part of the XHTML specification. This generation is a two-step process.

The first step involves converting from XHTML to an intermediate markup language. This intermediate language describes the JAVA programming language equivalent widgets to use. The widget set essentially includes all the basic form elements of an XHTML form. The form elements include a button, a checkbox, an image button, a radio button, a dropdown, a text area, a text field, a paragraph block, and an image. The intermediate markup maps between the XHTML and these widgets. These will be the basic set required to operate the same as an XHTML form would.

The code generator takes the widgets in the intermediate markup and maps them to the appropriate widgets that have been defined. From this new markup, the code generator parses through the document and handles each element appropriately. For the implementation, the code generator has parsed into a DOM tree so that it can use that as its parse tree directly.

In one embodiment, each widget implements an IFormElement. This interface defines two methods as follows:

```
public interface IFormElement {
    public String getName( );
    public Object getValue( );
}
```

The primary purpose of the interface is to provide a way to get at the data in the form element. Note that the getvalue( ) method returns an object rather than a string. This is so that the code generator can create non-XHTML like views that can return regular JAVA programming language objects rather than just strings.

The form elements themselves are added to a container, which is the view. This container must extend from the AbstractPage class. The AbstractPage contains record keeping methods to keep track of all the variables that need to get "posted" back to the workflow when the view is done.

One of the methods that the AbstractPage provides is the show( ) method. This method is the entry point to show the view. It is the responsibility of the implementations to actually display a GUI frame for the widgets to get displayed. Note that once the page is displayed, the show( ) method will return immediately and allow the GUI thread to handle the keyboard and pointer events. However, if the method returns immediately, the workflow may continue executing actions without waiting for the user. A wait-notify call is employed to make the workflow wait for the user to submit the page. (Note that the usage of this mechanism is entirely optional. Advanced usage could involve letting the workflow continue processing while the view has not finished. However, the case that will simulate the full-blown application running engine is to wait until the user submits the form.)

The following may be performed after the user interface has finished initializing in order to make the workflow wait until the user has finished submitting the page.

```
try {
    synchronized(this) {
        this.wait( );
    }
} catch (InterruptedException err) { }
```

A submit button press will invoke the following code to release the wait, allowing the workflow to continue processing.

```
synchronized (this) {
    this.notify( );
}
```

The request variables are not actually maintained by the view. Rather, the request variables are actually maintained by the submodel class that uses the view. This allows the view to be destroyed after the user submits the page while still allowing the workflow to access the request variables.

Form submission involves a call to the submitForm( ) method. This method takes all the form elements within a form and stores them in the request variables hash table. Note that a mapping occurs between the form elements and the request variables. This is to support advanced markup languages such as WML where variables in the form can be mapped to different names for the request variable. With this mapping, the code generator is able to handle WML as well as XHTML.

AWT Code Generation

For AWT code generation of the views, the code generator makes an AbstractAWTPage class that extends from the AbstractPage class. This will implement a simple container that allows form elements to be inserted on the page. The container is essentially an AWT frame. Users who wish to manually customize their interfaces can extend from this class.

Finally, an AWTBrowser extent from the AbstractAWTPage class. It defines a general mechanism for adding form elements to the page. The page will set the layout to use the JAVA programming language GridBagLayout, which mimics an XHTML table clement. It will also add a scroll pane so that users can scroll to see other form elements that do not fit on a page.

AWTBrowser may also define a generic addElement( ) method that takes a form element object to be added. The code generator will generate code that calls the addElement( ) method. Each added element will essentially be a line of code in the show( ) method. The following is a sample of the generated code:

```
public class Pick extends AWTBrowser {
    public void show( ) {
        FormRadioFactory radioFactory = null;
        FormSelect formSelect;
        FormButton formButton;
```

-continued

```
        ParaImage paraImg;
        Para para;
        Object name, value;
        setTitle("Choose Cocktail");
        paraImg = new ParaImage(getVar("cocktail.gif"));
        addElement(paraImg);
        addElement(new Para(getVar("Pick a cocktail")));
        formSelect = new FormSelect("index", 1, false, null);
        formSelect.add(getVar("0"), getVar("Admiral"), false);
        formSelect.add(getVar("1"), getVar("Algonquin"), false);
        formSelect.add(getVar("2"), getVar("Black Russian"), false);
        formSelect.add(getVar("3"), getVar("Bloody Mary"), false);
        formSelect.add(getVar("4"), getVar("Blue Hawaiian"), false);
        formSelect.add(getVar("5"), getVar("BMW"), false);
        formSelect.add(getVar("6"), getVar("Brain Hemorrage"), false);
        formSelect.add(getVar("7"), getVar("Daiquiri"), false);
        formSelect.add(getVar("8"), getVar("Havana Beach"), false);
        formSelect.add(getVar("9"), getVar("Kamikaze"), false);
        formSelect.add(getVar("10"), getVar("Long Island Tea"), false);
        formSelect.add(getVar("11"), getVar("Margarita"), false);
        formSelect.add(getVar("12"), getVar("Martini"), false);
        formSelect.add(getVar("13"), getVar("Pina Colada"), false);
        formSelect.add(getVar("14"), getVar("Sea Breeze"), false);
        formSelect.add(getVar("15"), getVar("Tequila Sunrise"), false);
        formSelect.add(getVar("16"), getVar("Tom Collins"), false);
        formSelect.add(getVar("17"), getVar("Wiskey Sour"), false);
        addElement(formSelect);
        addNewLine( );
        formButton = new FormButton(getVar("Get"), this);
        formButton.addMap("__index", "$(index)");
        formButton.addMap("__cmd", "OK");
        addElement(formButton);
        formButton = new FormButton(getVar("Exit"), this);
        formButton.addMap("__cmd", "EXIT");
        addElement(formButton);
        formButton = new FormButton(getVar("OK"), this);
        formButton.addMap("index", "$(index)");
        addElement(formButton);
        addNewLine( );
        super.show( );
        super.modal( );
    }
}
```

MIDP Code Generation

For MIDP code generation of the views, the code generator makes an AbstractMIDPPage class that extends from the AbstractPage class. Like the AWT counterpart, the AbstractMIDPPage class implements a simple container that allows form elements to be inserted on the page. This class may be very similar to the AbstractAWTPage except that it may use a Display class for the container rather than an AWT Frame class.

The real implementation of the MIDP page is the MIDPBrowser. The MIDPBrowser defines an addElement( ) method like the AWTBrowser. In the MIDP page, the code generator must do additional processing on the page. The reason for this is that the MIDP specification does not define a scrollpane-like mechanism to scroll to other elements on a page in the event the elements do not fit. Furthermore, some of the form elements in MIDP require the full screen.

To deal with displaying XHTML form elements, the code generator introduces page splitting to allow the user to navigate between pages without making the application designer implement code in the workflow to do this.

The code generator will still generate calls that call the addElement( ) method for each form element. The resulting code will essentially amount to one line of code per element in the show( ) method. As the addElement( ) is called, the code generator does not add the elements to the Display directly. The code generator keeps all the widgets in a list. Then, when the workflow calls the show( ) method, the code generator walks through the list to determine where to put the page breaks. Wherever a page break occurs, the code generator adds next/previous soft buttons (MIDP Commands) as appropriate. The MIDPBrowser class also listens for Commands coming from the page. When it receives the next/previous command, it will rebuild the Display to display only the appropriate widgets. The following is a sample implementation of this show( ) method.

```
public void show( ) {
    int size = screens.size( );
    Displayable disp = (Displayable)screens.elementAt(0);
    disp.setCommandListener(this);
    if (disp instanceof Form) {
        ((Form)disp).setItemStateListener(this);
    }
    if (size>1) {
        disp.addCommand(new NavNext( ));
    }
    for (int i=1; i<size-1; i++) {
        disp = (Displayable)screens.elementAt(i);
        disp.setCommandListener(this);
        disp.addCommand(new NavNext( ));
        disp.addCommand(new NavPrev( ));
        if (disp instanceof Form) {
            ((Form)disp).setItemStateListener(this);
        }
    }
    if (size>1) {
        disp = (Displayable)screens.elementAt(size-1);
        disp.setCommandListener(this);
        disp.addCommand(new NavPrev( ));
        if (lastPageCmds!=null) {
            for (int i=0; i<lastPageCmds.size( ); i++) {
                disp.addCommand((Command)lastPageCmds.elementAt(i));
            }
        }
        if (disp instanceof Form) {
            ((Form)disp).setItemStateListener(this);
        }
    } else {
        if (lastPageCmds!=null) {
            for (int i=0; i<lastPageCmds.size( ); i++) {
                disp.addCommand((Command)lastPageCmds.elementAt(i));
            }
        }
    }
    currentPage = 0;
    setPage((Displayable)screens.elementAt(currentPage));
    setTitle(title);
    super.show( );
}
```

The following is some sample generated code specifically for the MIDP API.

```
public class Pick extends MIDPBrowser {
    public void show( ) {
        FormRadio formRadio;
        FormSelect formSelect;
        FormAnchor anchor;
        FormButton formButton;
        setTitle("Choose Cocktail");
        try {
            addElement(new ImageItem(null,
Image.createImage(getImgVar("cocktail.png")), ImageItem.LAYOUT_LEFT,
null));
            addElement(" ");
        } catch (Exception err) { }
        addNewLine( );
        formRadio = new FormRadio("index");
        formRadio.add((String)getVar("0"), (String)getVar("Admiral"), true);
        formRadio.add((String)getVar("1"), (String)getVar("Algonquin"), true);
        formRadio.add((String)getVar("2"), (String)getVar("Black Russian"), true);
        formRadio.add((String)getVar("3"), (String)getVar("Bloody Mary"), true);
        formRadio.add((String)getVar("4"), (String)getVar("Blue Hawaiian"), true);
        formRadio.add((String)getVar("5"), (String)getVar("BMW"), true);
        formRadio.add((String)getVar("6"), (String)getVar("Brain Hemorrage"), true);
        formRadio.add((String)getVar("7"), (String)getVar("Daiquiri"), true);
        formRadio.add((String)getVar("8"), (String)getVar("Havana Beach"), true);
        formRadio.add((String)getVar("9"), (String)getVar("Kamikaze"), true);
        formRadio.add((String)getVar("10"), (String)getVar("Long Island Tea"), true);
        formRadio.add((String)getVar("11"), (String)getVar("Margarita"), true);
        formRadio.add((String)getVar("12"), (String)getVar("Martini"), true);
        formRadio.add((String)getVar("13"), (String)getVar("Pina Colada"), true);
        formRadio.add((String)getVar("14"), (String)getVar("Sea Breeze"), true);
        formRadio.add((String)getVar("15"), (String)getVar("Tequila Sunrise"), true);
        formRadio.add((String)getVar("16"), (String)getVar("Tom Collins"), true);
        formRadio.add((String)getVar("17"), (String)getVar("Wiskey Sour"), true);
        addElement(formRadio);
        anchor = new FormAnchor(getVar("Get"));
        formButton = new FormButton(getVar("Get"));
        anchor.addMap("_index", "$(index)");
        formButton.addMap("_index", "$(index)");
        anchor.addMap("_cmd", "OK");
        formButton.addMap("_cmd", "OK");
        addElement(anchor);
        addElement(formButton);
        anchor = new FormAnchor(getVar("Exit"));
```

-continued

```
        formButton = new FormButton(getVar("Exit"));
        anchor.addMap("__cmd", "EXIT");
        formButton.addMap("__cmd", "EXIT");
        addElement(anchor);
        addElement(formButton);
        addNewLine( );
        formButton = new FormButton(getVar("OK"));
        formButton.addMap("index", "$(index)");
        addElement(formButton);
        super.show( );
        super.modal( );
    }
}
```

Handling Localization of Resources During Code Generation of Templates

The XHTML templates might reference string resources that have been defined in message bundles. As part of the process of localizing an application, the strings that have been used in the templates are exported to external files. These files use a naming convention that follows the standard {language}_{country} code convention. Each entry in the file may be a key-to-localized text entry.

There are two approaches to merging the strings into the code-generated output that may be employed by the code generator. The first approach is to create a separate class that contains a method to retrieve strings based on the keys passed to it. The second is to embed the strings where they are used in the code generated templates.

The advantage of the first approach is that during packaging, the code generator can do a simple class replacement to create a different version of a localized application. Also, in a J2SE environment where the message bundle APIs exist, the code generator can use a naming convention to pick up the correct resource file depending on the locale. This is how the application running engine does its localization based on the incoming locale. The disadvantage is that the code generator must instantiate the class and keep a reference of it in memory. All the strings in the application will be in memory. Furthermore, there is some cost involved in looking up strings.

The advantage of embedding the strings within the code-generated template is that the code is faster. However, the main disadvantage is that code must be regenerated if a different locale is required.

Regardless of which approach, the build process will still generate a different package (e.g. JAR file) for each locale because a smart client device will not have more than one locale on it at any given time. If more than one locale exists on the device, then the code generator may use the first approach of generating external classes for each locale and then packaging all the locales in a single JAR file.

There is also one additional issue That the code generator addresses. The message bundles are typically stored in UTF-8 format The code generator will be generating JAVA programming language code. While it is possible to output the JAVA programming language code in UTF-8, it might make it inconvenient for users to edit the code if they do not have an editor that can open a UTF-8 file. The solution is to save the generated JAVA programming language code in the system's default encoding, but encode the contents of strings statically as escaped Unicode characters in the form of uxxxx, where xxxx is a 16-bit hexadecimal value. A sample implementation of a method to escape these strings is as follows:

```
private String escapeString(String str) {
    StringBuffer sb = new StringBuffer(str.length( )*2);
    for (int i=0; i<str.length( ); i++) {
        char c = str.charAt(i);
        switch (c) {
        case '"': // Escape double quotes
            sb.append('\\'); sb.append('"'); break;
        case '\\': // Escape backslashes
            sb.append('\\'); sb.append('\\'); break;
        case '\t': // Escape tabs
            sb.append('\\'); sb.append('t'); break;
        case '\n': // Escape newlines
            sb.append('\\'); sb.append('n'); break;
        case '\r': // Escape carriage returns
            sb.append('\\'); sb.append('r'); break;
        case '\f': // Escape line feeds
            sb.append('\\'); sb.append('f'); break;
        default:
            if ((c<0x0020) || (c>0x007e)) {
                // Escape unicode character
                sb.append('\\'); sb.append('u');
                sb.append(toHex((c>>12)&0xF));
                sb.append(toHex((c>>8)&0xF));
                sb.append(toHex((c>>4)&0xF));
                sb.append(toHex( c    &0xF));
            } else {
                // Regular character
                sb.append(c);
            }
        }
    }
    return sb.toString( );
}
```

Packaging Components

Components present a set of different issues when building code. The reason is that components are essentially self-contained versions of full-blown projects. That means that for the components to be used, the builder must also generate the appropriate code for components and merge the results with the project that uses those components. Furthermore, a component might not support being used in a project because it does not build to a specific target. All these issues must be resolved. Identifying the targets of components will be described in the section on ANT build scripts. Briefly, such information will be contained within a project.xml file that will describe the targets for the builds and also the requirements of those targets.

Using Build System to Combine the Generated Outputs and Resources Into a Complete Application.

The build process revolves around some sort of build script to manage the various tools and the order in which the tools are called. In one embodiment, the code generator uses the ANT tool as an example build system, although other make tools can be used. The code generator utilizes a set of build scripts that will read a project descriptor file and then build the project based on the requirements of the project file. Alternatively, the code generator may create a custom build script for each project based on its requirements. While the latter method may be more flexible, issues may arise if the user attempts to edit the files to add their own build process. Hence, generated build scripts are not human-friendly.

The project.xml file consists of a series of "deploy" sections that specify the target to deploy to. Under each deploy section will be a series of descriptors that tell the build scripts which files to deploy and what to generate code for. The following is a sample Project.xml file that describes a project:

```xml
<?xml version="1.0"?>
<deployments project="Project" version="1.0">
    <config>
        <workdir name=".workdir"/>
        <outdir name=".output"/>
        <toolsdir name=" builder/tools"/>
        <logging loglevel="0" decorations="false" enable="true" logfile="build.log"/>
    </config>
    <deploy type="PJava__AWT_1__0">
        <files>
            <glob path="*.class" todir="."/>
            <glob path="images/*" todir="media"/>
        </files>
        <components>
        </components>
        <classpath>
        </classpath>
        <pre>
        </pre>
        <post>
        </post>
        <parameters>
            <parameter name="app.name" value="app"/>
            <parameter name="app.author" value="Covigo"/>
            <parameter name="app.classname" value="App"/>
            <parameter name="deploy.path" value="/deploy/pjava__awt"/>
        </parameters>
        <models>
            <model name="StartModel" deploy="true">
                <layer name="Root" deploy="true"/>
                <layer name="Comments" deploy="true"/>
            </model>
            <model name="ErrorModel" deploy="true">
                <layer name="Root" deploy="true"/>
                <layer name="Comments" deploy="true"/>
            </model>
        </models>
    </deploy>
    <deploy type="Engine__1__0">
        <files>
            <glob path="beanimages/*" todir="beanimages"/>
            <glob path="*.class" todir="classes"/>
            <glob path="*.ag" todir="."/>
            <glob path="*.sig" todir="."/>
            <glob path="templates/*" todir="templates"/>
            <glob path="filesrcs/*" todir="filesrcs"/>
            <glob path="grammars/*" todir="media"/>
            <glob path="images/*" todir="media"/>
            <glob path="wavs/*" todir="media"/>
            <glob path="MessagesBundle*" todir="."/>
            <glob path="ProjectGrammars*" todir="."/>
            <glob path="ProjectImages*" todir"."/>
            <glob path="ProjectWavs*" todir"."/>
            <glob path="models/*.vw" todir="models"/>
        </files>
        <components>
        </components>
        <classpath>
        </classpath>
        <pre>
        </pre>
        <post>
        </post>
        <parameters>
            <parameter name="deploy.server" value="http://engdev1:8102"/>
            <parameter name="deploy.repository" value="repos"/>
            <parameter name="deploy.username" value="admin"/>
            <parameter name="deploy.password" value="pass"/>
```

```
        </parameters>
        <models>
            <model name="StartModel" deploy="true">
                <layer name="Root" deploy="true"/>
                <layer name="Comments" deploy="true"/>
            </model>
            <model name="ErrorModel" deploy="true">
                <layer name="Root" deploy="true"/>
                <layer name="Comments" deploy="true"/>
            </model>
        </models>
    </deploy>
</deployments>
```

The ANT build script actually runs the project.xml file through an XSLT transformer with a stylesheet to generate an ANT-compliant build script. The ANT will run this script. In order to support customization, a separate target within the ANT script may be specified such that if the user defines that target, then that target will become active for the build.

Extending the Approach Described in Present Invention to Generate Code in Other Languages The foregoing examples were specific to the JAVA programming language. However, because the workflow paradigm is a high-level description of an application that is independent of development environment programming language, or device platform, the present invention could be easily implemented to generate code to other different programming languages such as C or BASIC, as will be appreciated by those skilled in the art.

To understand how this can be done, one may examine how the workflow operates. There are states and there are transitions between states. Each state has the option of presenting the user with some information and gathering information from that user. In addition, various high-level functions are available to be called on the states or on the transitions.

As such, transitions are like "goto" or "jump" statement. A state is simply a location in code. This can be specified as a label for a compiler or as shown in the JAVA programming language example, a method that can be called.

For the user interaction, there needs to be a standard way for the view to communicate with the workflow. The preferred embodiment utilizes a simple "in" interface where values are associated with names in a name-value paired list. The workflow can then identify values to retrieve by name. Other methods can also be used. For WINDOWS operating system COM, the workflow can perform a query on a view abject to retrieve all of the properties of that object. Then, user-entered data can be stored in the properties.

For calls to sub-models or sub-controllers, a new stack frame is created. So, this can be implemented as a method call in the programming language. If the language does not support method calls, then a data structure can be created to store data in different scopes.

The only other requirements of the language to generate code for are some kind of branch and some method of performing comparisons. This is for the conditions that can exist on transitions to determine whether the transition should be taken or not.

So, there are actually many ways to output the code. What the workflow does is to use a simple state-transition diagram that forms the basis of computing. From this basic diagram, code is generated for a particular language.

Appended to the above-referenced provisional application Ser. No. 60/350,858 as Appendix to Workflow Code Generator is an example of code generated by the workflow code generator of the present invention for a currency converter application, the entire disclosure of which is hereby incorporated by reference.

It should be understood that the inventions described herein are provided by way of example only and that numerous changes, alterations, modifications, and substitutions may be made without departing from the spirit and scope of the inventions as delineated within the following claims.

What is claimed is:

1. A method for transforming an input file for a multi-channel application into executable code, the method comprising the steps of:

analyzing declarative statements within the input file to form an un-compiled intermediate model of the declarative statements;

analyzing the un-compiled intermediate model to remove inconsistencies from the un-compiled intermediate model;

analyzing the un-compiled intermediate model to provide optimizations;

appending additional information to objects in the un-compiled intermediate model to aid in code generation; and outputting a file containing executable source code for a compiler, the file being based upon the un-compiled intermediate model.

2. The method of claim 1 wherein the step of analyzing declarative statements within the input file to form an un-compiled intermediate model comprises:

interpreting the declarative statements and mapping said declarative statements to objects; and interpreting the declarative statements to form relationships between objects.

3. The method of claim 1 wherein the step of analyzing the un-complied intermediate model to remove inconsistencies comprises:

traversing through the un-compiled intermediate model to discover and remove unreachable objects.

4. The method of claim 1 wherein the step of analyzing the un-compiled intermediate model to provide optimizations comprises:

traversing through the un-compiled intermediate model;

eliminating unused objects which have no relationships to other objects; and replacing predefined object-to-object relationships with known optimized relationships.

5. The method of claim 1 wherein the step of appending additional information comprises:
   traversing through the un-compiled intermediate model to discover resources used within the un-compiled intermediate model;
   storing discovered resources in a temporary storage; and
   marking the location of the discovered resources in the temporary storage.

6. The method of claim 5 wherein the step of traversing through the un-compiled intermediate model comprises:
   going through each of the objects in a certain order;
   outputting a code fragment assigned to each object; and
   outputting the code fragment assigned to relationships from each object.

7. The method of claim 1 wherein the step of outputting a file containing executable source code comprises:
   traversing through the un-compiled intermediate model to identify objects in the un-compiled intermediate model; and
   assigning code fragments to identified objects and object relationships.

8. The method of claim 7 wherein the step of assigning code fragments includes:
   mapping a particular object type with a code template that is to represent the object; and
   resolving a resource used by an object by referring to a temporary storage in which the resource is stored.

9. A method for-generating executable code for a multi-channel application, comprising the steps of:
   receiving input files for the application;
   reading the input files with a parser;
   generating an un-compiled internal model of declarative statements contained within the input files;
   pre-processing the un-compiled internal model to obtain a pre-processed model;
   traversing the pre-processed model to assign code fragments for patterns of objects; and
   generating, in response to the pre-processed model, executable source code assigned to each object.

10. The method of claim 9 further comprising:
    marking traversed objects so that the traversed objects are not revisited.

11. The method of claim 9 further comprising:
    outputting a file containing the generated executable source code to a compiler.

12. The method of claim 9 wherein the step of pre-processing the un-compiled internal model comprises:
    removing unused objects;
    eliminating unreachable code; and
    replacing patterns of objects with a known optimized pattern.

13. The method of claim 12 further comprising:
    marking references to data objects in a resource mapping table during pre-processing; and
    resolving data object references by referring to a resource mapping table.

14. A method for-generating executable code for a multi-channel application, the method comprising:
    receiving input files for the application, the input files including declarative statements that describe functionality for the application;
    generating an internal model of the declarative statements;
    traversing the internal model to optimize objects of the internal model;
    assigning code fragments to objects of the internal model; and
    processing the code fragments to generate executable source code that is formatted for compatibility with an intended device platform compiler.

15. A method according to claim 14, wherein the internal model comprises an intermediate markup language file.

16. A method according to claim 14, wherein the input files comprise:
    a workflow model that represents application logic;
    a bean image that represents data bound to an object; and
    an XHTML template that represents a user interface for the application.

17. A method according to claim 14, wherein traversing the internal model to optimize objects of the internal model comprises:
    discovering unreachable objects in the internal model; and
    removing discovered unreachable objects from the internal model.

18. A method according to claim 14, further comprising:
    maintaining a resource-mapping table; and
    analyzing the resource-mapping table to retrieve a mapped code fragment for an object in the internal model, the mapped code fragment representing a source code equivalent for accessing a mapped resource using the intended device platform language.

19. A method according to claim 14, wherein processing the code fragments generates a JAVA programming language code.

20. A method according to claim 14, wherein processing the code fragments generates a C programming language code.

* * * * *

UNITED STATES PATENT AND TRADEMARK OFFICE
CERTIFICATE OF CORRECTION

| | | |
|---|---|---|
| PATENT NO. | : 7,152,229 B2 | Page 1 of 1 |
| APPLICATION NO. | : 10/346965 | |
| DATED | : December 19, 2006 | |
| INVENTOR(S) | : Chong et al. | |

It is certified that error appears in the above-identified patent and that said Letters Patent is hereby corrected as shown below:

In claim 19, column 47, line 28, delete the word "for-generating" and insert the words --for generating--.

In claim 14, column 48, line 6, delete the word "for-generating" and insert the words --for generating--.

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,152,229 B2  Page 1 of 1
APPLICATION NO. : 10/346965
DATED : December 19, 2006
INVENTOR(S) : Chong et al.

It is certified that error appears in the above-identified patent and that said Letters Patent is hereby corrected as shown below:

In claim 9, column 47, line 28, delete the word "for-generating" and insert the words --for generating--.

In claim 14, column 48, line 6, delete the word "for-generating" and insert the words --for generating--.

This certificate supersedes Certificate of Correction issued March 6, 2007.

Signed and Sealed this

Eighth Day of May, 2007

JON W. DUDAS
*Director of the United States Patent and Trademark Office*